United States Patent
Donlagic

(10) Patent No.: US 8,655,123 B2
(45) Date of Patent: Feb. 18, 2014

(54) IN-LINE OPTICAL FIBER DEVICES, OPTICAL SYSTEMS, AND METHODS

(75) Inventor: Denis Donlagic, Marlbor (SI)

(73) Assignee: University of Maribor, Maribor (SI)

( * ) Notice: Subject to any disclaimer, the term of this patent is extended or adjusted under 35 U.S.C. 154(b) by 65 days.

(21) Appl. No.: 13/046,666

(22) Filed: Mar. 11, 2011

(65) Prior Publication Data

US 2012/0230641 A1    Sep. 13, 2012

(51) Int. Cl.
G02B 6/26    (2006.01)
G02B 6/42    (2006.01)

(52) U.S. Cl.
USPC .......... 385/30; 385/12; 385/15; 385/27; 385/31; 385/39; 385/50

(58) Field of Classification Search
USPC ............................... 385/30, 39, 50
See application file for complete search history.

(56) References Cited

U.S. PATENT DOCUMENTS

| | | | |
|---|---|---|---|
| 4,261,640 A | 4/1981 | Stankos et al. | |
| 4,684,215 A * | 8/1987 | Shaw et al. | 385/4 |
| 5,202,939 A | 4/1993 | Belleville et al. | |
| 5,301,001 A | 4/1994 | Murphy et al. | |
| 5,452,087 A | 9/1995 | Taylor et al. | |
| 5,528,367 A | 6/1996 | Putnam et al. | |
| 5,572,618 A | 11/1996 | DiGiovanni et al. | |
| 5,652,813 A | 7/1997 | Wilson | |
| 5,768,462 A * | 6/1998 | Monte | 385/123 |
| 5,777,763 A | 7/1998 | Tomlinson, III | |
| 6,003,340 A | 12/1999 | Borak et al. | |
| 6,211,957 B1 | 4/2001 | Erdogan et al. | |
| 6,281,976 B1 | 8/2001 | Taylor et al. | |
| 6,411,749 B2 | 6/2002 | Teng et al. | |
| 6,434,283 B2 | 8/2002 | Frederick et al. | |
| 6,539,136 B1 | 3/2003 | Dianov et al. | |
| 6,567,173 B1 | 5/2003 | Johannesen | |
| 6,608,952 B2 | 8/2003 | Eggleton et al. | |
| 6,874,949 B2 | 4/2005 | Azimi et al. | |
| 7,693,369 B2 | 4/2010 | Fan et al. | |
| 2004/0223679 A1 | 11/2004 | Pickrell et al. | |
| 2008/0129980 A1 | 6/2008 | Dhawan et al. | |
| 2009/0169151 A1 | 7/2009 | Neitzel et al. | |
| 2010/0182607 A1 | 7/2010 | Chau et al. | |
| 2011/0311179 A1 * | 12/2011 | Greenaway | 385/12 |

FOREIGN PATENT DOCUMENTS

| | | |
|---|---|---|
| JP | 2001-280922 | 10/2001 |
| JP | 2002-162292 | 6/2002 |
| WO | WO 88/05550 | 7/1988 |

(Continued)

OTHER PUBLICATIONS

Cibula et al. "Low-loss semi-reflective in-fiber mirrors". Optics Express, May 2010, vol. 18, No. 11, pp. 12017-12026.

(Continued)

*Primary Examiner* — Ryan Lepisto
(74) *Attorney, Agent, or Firm* — Dugan & Dugan, PC

(57) ABSTRACT

An in-line optical device adapted to be bonded in between ends of an optical fiber line is disclosed. The in-line optical device has an inner optical field interaction region, an outer support structure, and at least one radial opening. In some embodiments, a void region substantially surrounds the inner optical field interaction region. Systems including the in-line optical device and methods of making and using the in-line optical device are provided. Numerous other aspects are provided.

17 Claims, 20 Drawing Sheets

(56) References Cited

FOREIGN PATENT DOCUMENTS

| WO | WO 89/01614 | 2/1989 |
| WO | WO 2004/023171 A2 | 3/2004 |
| WO | WO 2005/121697 | 12/2005 |
| WO | WO 2009/036567 | 3/2009 |

OTHER PUBLICATIONS

Donlagic et al., U.S. Appl. No. 12/758,738, filed Apr. 12, 2010.
Donlagic et al., U.S. Appl. No. 13/046,659, filed Mar. 11, 2011.
Donlagic et al., U.S. Appl. No. 13/046,648, filed Mar. 11, 2011.

* cited by examiner

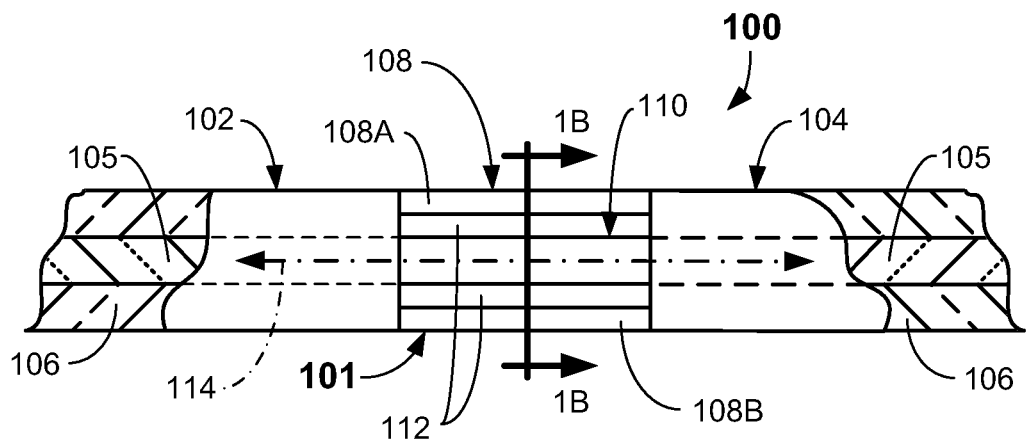
FIG. 1A
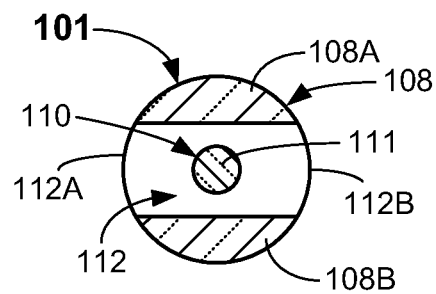
FIG. 1B
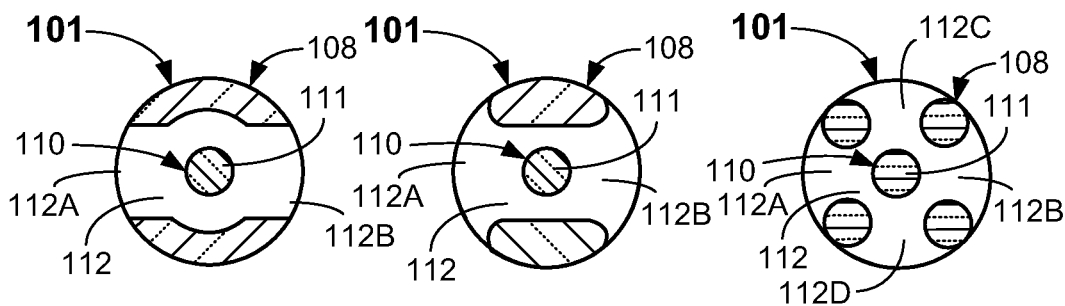
FIG. 1C     FIG. 1D     FIG. 1E

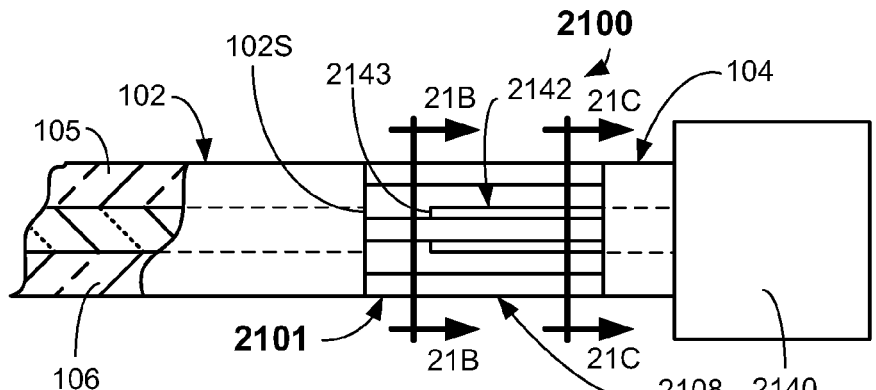
FIG. 21A
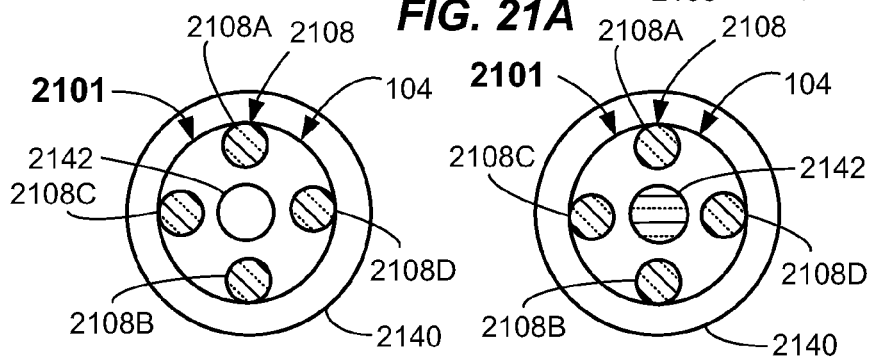
FIG. 21B  FIG. 21C
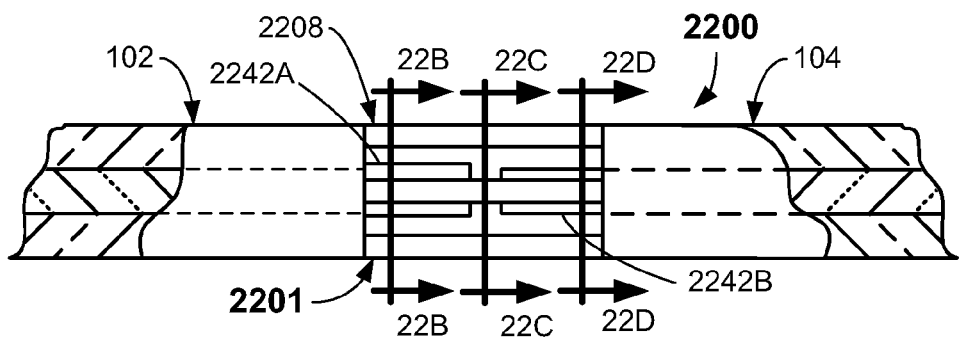
FIG. 22A
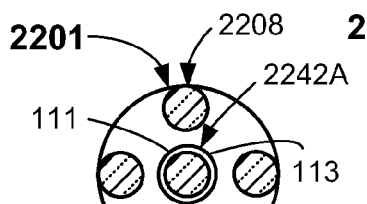 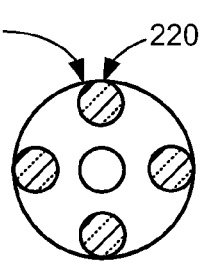 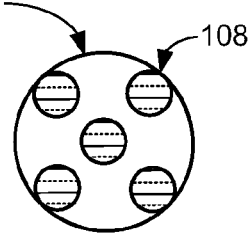
FIG. 22B  FIG. 22C  FIG. 22D

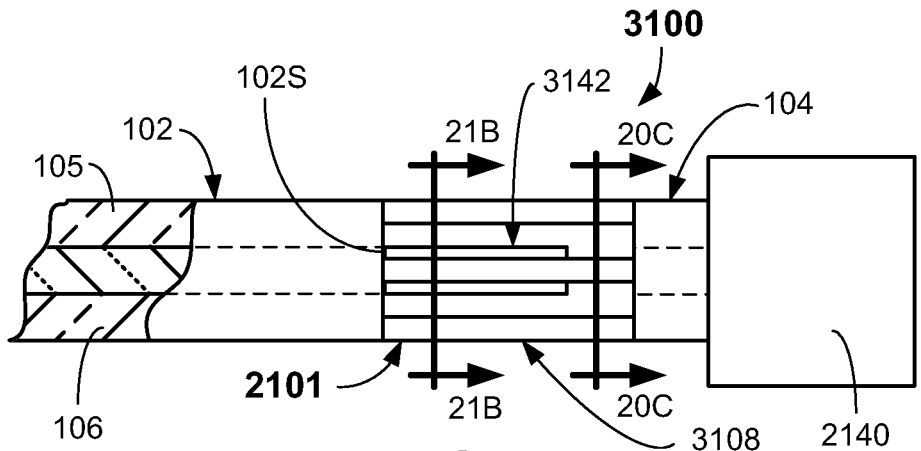
*FIG. 31*
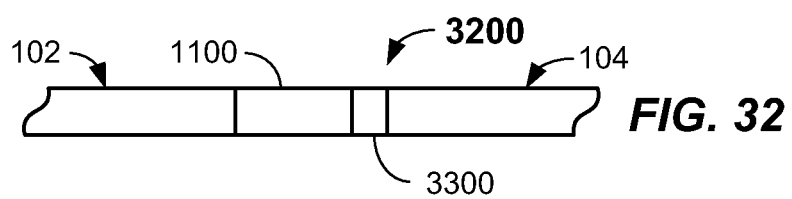
*FIG. 32*
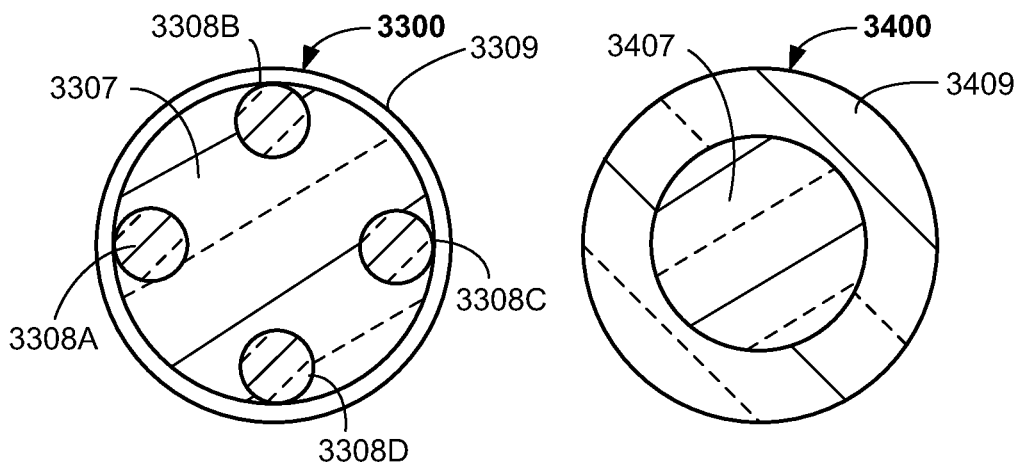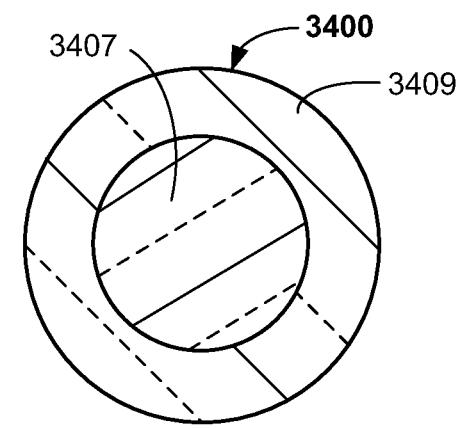
*FIG. 33*   *FIG. 34*
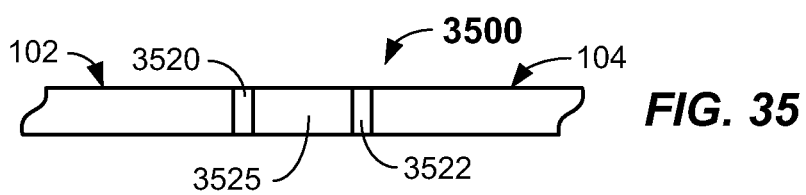
*FIG. 35*

IN-LINE OPTICAL FIBER DEVICES, OPTICAL SYSTEMS, AND METHODS

FIELD OF THE INVENTION

The present invention relates to an in-line optical device, and more particularly to an in-line optical device adapted to be connected to an optical fiber.

BACKGROUND OF THE INVENTION

Modern telecommunications, optical sensors, lasers and similar systems often use optical fiber links to transmit light between two spatially-separated locations. It is often desired to include different types of photonics devices within such optical fiber links to perform manipulation of the light that is transmitted through the fiber. Such in-line devices may provide thin film filters used in dense wavelength division multiplexing (DWDM) systems, other optical filters and optical spectrum manipulation devices, attenuators, measurement systems, polarizers, in-line light detection and manipulation optoelectronic circuits, sensors, optical isolators, and similar devices that can perform various manipulations of the light propagating along a fiber. Most such devices may tend to be either relatively bulky in size or utilize micro-optical components that are relatively costly to manufacture.

In some systems, the in-line device is integrated within optical fiber. One such well known and widely used in-line fiber device is a fiber Bragg grating. Fiber Bragg gratings can be found in variety of forms and applications, such as in-line sensor for sensing of physical and chemical parameters, in-line optical filters, and other more complex devices, such as dispersion compensators. Fiber Bragg gratings are usually formed by periodic illumination of short section of an optical fiber with ultraviolet light that causes permanent changes in glass structure and thereby its refractive index. Such devices may exhibit large temperature dependence.

Other in-line optical device designs may suffer from considerable optical losses that may limit the optical functions that they can perform. Device fabrication processes may also require assembly of multiple fiber-like optical elements, thereby increasing complexity and cost.

Thus, given the above, it should be recognized that in-line optical devices may be somewhat performance limited, and/or their manufacturing may be relatively complicated. Moreover, they may not be of the same size as the fibers they couple to, i.e., they may be bulky. Accordingly, there is a long felt and unmet need for highly effective, miniature, in-line optical devices and manufacturing methods thereof.

SUMMARY OF THE INVENTION

In one aspect, an in-line optical device is provided. The in-line optical device includes a field interaction region of an optically-transmissive material, the field interaction region having a central axis; a support structure spaced from the central axis having one or more radial openings; and a void between the support structure and the field interaction region, the void substantially surrounding the field interaction region.

In another aspect, an in-line optical device is provided. The in-line optical device includes a field interaction region including at least a core of an optically-transmissive material, the field interaction region having a central axis; and a support structure spaced from the central axis having a first radial opening and a second radial opening both extending to the field interaction region.

In another aspect, an in-line optical device is provided. The in-line optical device includes a field interaction region comprising a non-solid void, the field interaction region having a central axis; and a support structure spaced from the central axis having one or more radial openings.

In another aspect, an in-line optical device is provided. The in-line optical device includes a field interaction region including at least a core of an optically-transmissive material, the field interaction region having a central axis; and a support structure spaced from the central axis having a first radial opening and a second radial opening extending to the field interaction region.

In another aspect, an in-line optical system is provided. The in-line optical system includes a first lead-in optical fiber; a second lead-in optical fiber; and an in-line optical device coupled between the first lead-in optical fiber and the second lead-in optical fiber, the in-line optical device including a field interaction region of an optically-transmissive material, the field interaction region having a central axis, a support structure spaced from a central axis having one or more radial openings, and a void between the support structure and the field interaction region, the void substantially surrounding the field interaction region.

In another system aspect, an optical system is provided. The optical system includes a first lead-in optical fiber; a second lead-in optical fiber; an in-line optical device coupled between first lead-in optical fiber and the second lead-in optical fiber, the in-line optical device including a field interaction region of an optically-transmissive material, the inner optical field interaction region having a central axis, a support structure spaced from a central axis having one or more radial openings, and a void between the support structure and the field interaction region, the void substantially surrounding the field interaction region; and an optical system adapted to send and receive light signals to and from the in-line optical device.

In another aspect, a method of manufacturing an in-line optical device is provided. The method includes providing a structure-forming fiber having a support structure forming portion, a field interaction region forming portion, and a preferentially-etchable portion; bonding the structure-forming fiber between a first lead-in fiber and a second lead-in fiber to form a bonded fiber assembly; and etching at least the structure-forming fiber to remove at least a portion of the preferentially-etchable portion to form an in-line optical device having a field interaction region, and a support structure having one or more radial openings.

In another aspect, a method of manufacturing an in-line optical device is provided. The method includes providing a structure-forming fiber having a support structure forming portion, a field interaction region forming portion, and a preferentially-etchable portion abutting the field interaction region forming portion; and etching the structure-forming fiber to remove at least a portion of the preferentially-etchable portion to form an in-line optical device having a field interaction region, and a support structure having one or more radial openings.

Numerous other aspects are provided in accordance with these and other aspects of the invention. Other features and aspects of the present invention will become more fully apparent from the following detailed description, the appended claims, and the accompanying drawings.

BRIEF DESCRIPTION OF THE DRAWINGS

FIG. 1A illustrates a partially cross sectioned side view of an embodiment of an in-line optical device coupled between two lead-in fibers according to an aspect of the invention.

FIG. 1B illustrates a cross sectioned end view of the in-line optical device of FIG. 1A taken along section lines 1B-1B.

FIGS. 1C-1E illustrate cross sectioned end views of alternative exemplary configurations of in-line optical devices according to optional aspects of the invention.

FIG. 21A illustrates a partially cross sectioned side view of another embodiment of an in-line optical acceleration measurement device according to another aspect of the invention.

FIG. 21B illustrates a cross sectioned end view of the in-line optical acceleration measurement device of FIG. 21A taken along section line 21B-21B.

FIG. 21C illustrates a cross sectioned end view of the in-line optical acceleration measurement device of FIG. 21A taken along section line 21C-21C.

FIG. 22A illustrates a partially cross sectioned side view of in-line optical device according to another aspect of the invention.

FIG. 22B illustrates a cross sectioned end view of in-line optical device of FIG. 22A taken along section line 22B-22B.

FIG. 22C illustrates a cross sectioned end view of in-line optical device of FIG. 22A taken along section line 22C-22C.

FIG. 22D illustrates a cross sectioned end view of in-line optical device of FIG. 22A taken along section line 22D-22D.

FIG. 31 illustrates a partially cross sectioned side view of an embodiment of an optical device including an in-line optical device that may be used as an acceleration sensor according to an aspect of the invention.

FIG. 32 illustrates a fiber assembly used to manufacture the optical device of FIG. 31 wherein the structure-forming fiber includes multiple segments of optical fibers according to an aspect of the invention.

FIG. 33 illustrates an enlarged cross sectioned end view of a structure-forming fiber that may be used to manufacture a portion of the in-line optical device of FIG. 31 according to another aspect of the invention.

FIG. 34 illustrates an enlarged cross sectioned end view of an alternative structure-forming fiber that may be used to manufacture a portion of the in-line optical device of FIG. 31 according to another aspect of the invention.

FIG. 35 illustrates a fiber assembly used to manufacture an optical device wherein segments of coreless optical fibers are provided between the lead-in fibers and the structure-forming fiber according to an aspect of the invention.

DETAILED DESCRIPTION

Figure 2A:
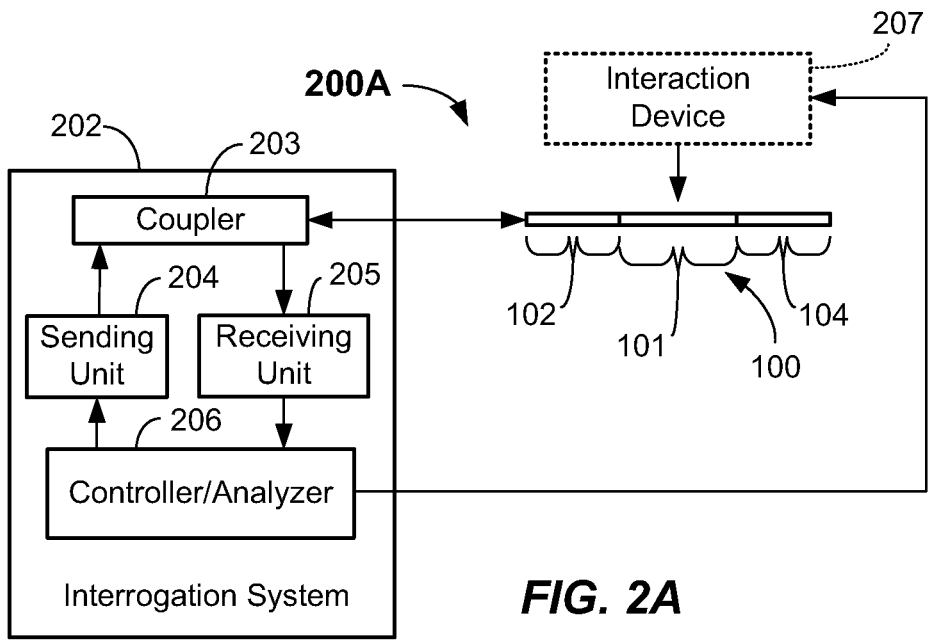
FIG. 2A illustrates a block diagram of an embodiment in-line optical device included in an optical system according to aspects of the invention.

The present invention discloses in-line optical devices adapted to allow interaction of an optical field propagating along the optical fiber core with various materials, fluids, micro-structures, nano-structures, or interaction devices. These interactions permit realization of various functions in telecommunication systems, sensor systems, testing systems (e.g., biological testing systems), and other light transmission applications.

According to a first aspect, the in-line optical device of the present invention allows for radial access to a field interaction region to allow interaction with an optical field propagating thereat.

A manufacturing method for the production of the in-line optical device is also disclosed. The method relies on a procedure that involves a fiber bonding steps and a micromachining step (e.g., etching in an etching medium). The micromachining step may be performed in large batches, which makes the method suitable for high volume, low cost manufacturing of optical devices including in-line optical devices.

In accordance with a first aspect of the present invention, an in-line optical device is provided. The in-line optical device includes a field interaction region of an optically-transmissive material (e.g., a core of silica or doped silica), the field interaction region having a central axis; a support structure spaced from the central axis having one or more radial openings; and a void between the support structure and the field interaction region, wherein the void substantially surrounds the field interaction region.

In another aspect of the present invention, an in-line optical device is provided having a field interaction region that comprises a non-solid void, the field interaction region having a central axis; and a support structure spaced from the central axis having one or more radial openings. The void extends between cores of respective lead-in fibers.

In another aspect of the present invention, an in-line optical device includes a field interaction region having a core of an optically-transmissive material, and a support structure having a first radial opening and a second radial opening extending to the field interaction region.

The present invention in some embodiments provides an in-line device that may be sensitive to, or used to sense, several different parameters, such as strain, mechanical stress, force, length change, acceleration, vibration, fluid flow, chemical parameters that can directly or indirectly cause elongation of the sensor, fluid properties, optical changes in materials properties exposed to the in-line optical device, or combinations thereof. The present invention may be particularly useful for applications where reduced size, immunity to electromagnetic interference (EMI), high thermal or chemical stability, and/or low drift are important characteristics.

These and other embodiments of the present invention are further described with reference to FIGS. 1A-36 below.

A first embodiment of an optical device 100 including an in-line optical device 101 according to an aspect of the invention is described with reference to FIGS. 1A-1B. The system 100 includes first and second lead-in optical fibers 102, 104 with the in-line optical device 101 coupled (e.g., bonded) between the respective ends of the first and second lead-in optical fibers 102, 104. In the depicted embodiment, the lead-in optical fibers 102, 104 may include a light guiding optical structure that is adapted to lead light to and from the in-line optical device 101. The light guiding optical structure may include a conventional core 105 and a cladding 106, for example. The lead-in optical fibers 102, 104 may have any arbitrary length. In some embodiments, the lead-in optical fiber 104 may be truncated or terminated (See FIG. 2A). Lead-in optical fibers 102, 104 may be, for example, single mode optical fibers, multimode optical fibers, polarization maintaining optical fibers, polarization preserving optical fibers, photonic crystal fibers, or any other practical optical fiber having the ability to carry light signals, or a combination thereof. The lead-in optical fibers may include two or more segments that may be coupled or fused together.

In more detail, and in accordance with a first embodiment, the in-line optical device 101 includes an outer support structure 108 (that in the depicted embodiment includes first and second support structures 108A, 108B), a field interaction region 110 adapted to allow interaction with an optical field propagating therein, and a void region 112. The support structure 108 may include one or more structural elements (e.g., two support structures 108A, 108B in this embodiment) that may function to assure an acceptable level of in-line mechanical and structural integrity and strength of the in-line device 101. The support structure 108 may provide structural support during device handling, packaging, installation and other intended or unintended mechanical interactions of the in-line optical device 101 with its surroundings. The support structure 108 may include any number of cross-sectional shapes and extends between the lead-in fibers 102, 104.

In some embodiments, the support structures 108A, 108B may have, for example, a quarter-moon shape as shown in FIG. 1B wherein an outer surface is cylindrical and an inner surface is generally planar. Optionally, the support structure 108 may consist of one or more rods of generally circular, generally elliptical, or any arbitrary cross-sectional shape. FIG. 1E illustrates an embodiment wherein the support structure 108 comprises rods. The support structures 108 may be distributed (e.g., symmetrically or asymmetrically arranged) around a central axis 114 of the in-line optical device 101. Suitable support structures 108 with shapes, such as is shown in FIGS. 1C-1E may be utilized. Other shapes may be used. In some embodiments, the support structure 108 may include a first support structure 108A spaced from the central axis 114, and a second support structure 108B also spaced from the central axis 114 on an opposite side of the axis 114 from the first support structure 108A.

Figure 36:
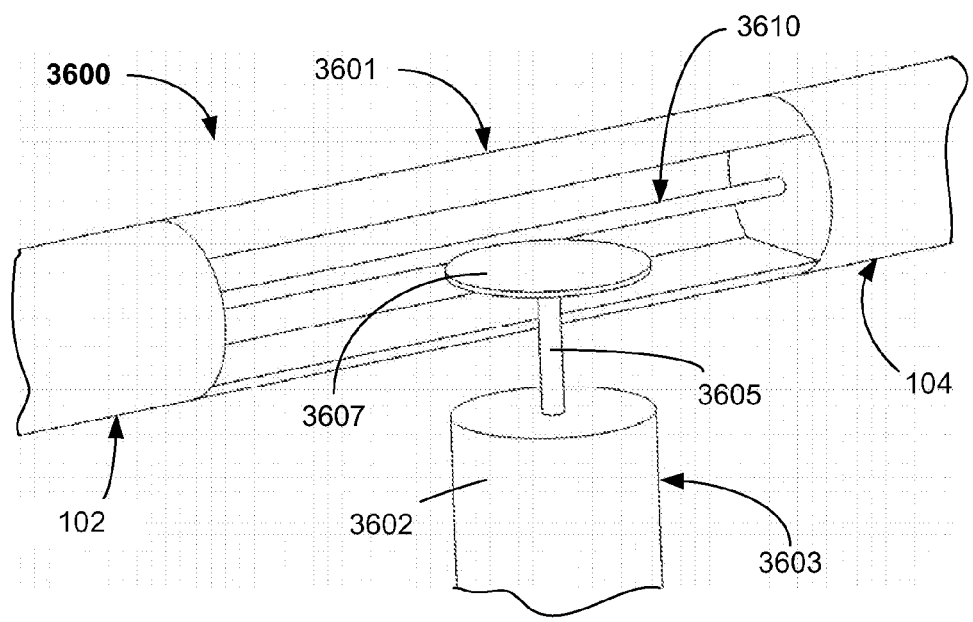
FIG. 36 illustrates a micro-resonator used with an optical device according to an aspect of the invention.

The field interaction region 110 in each embodiment functions as part of the in-line optical device 101 where an optical field passing through the in-line optical device 101 may interact with functional or functionalized materials, an interaction device, or a surrounding environment. For example, in one embodiment, the field interaction region 110 may be in fluid communication with a surrounding fluid (See FIG. 4). In another embodiment, the field interaction region 110 may be in communication with optically active layers. For example, one or more optically active layers may be applied overtop of the field interaction region 110. In another embodiment, the inner optical field interaction region 110 may be in communication with optical micro-structures or nano-structures. For example, an optical system 3600 may include a micro-resonator 3603 in contact with a field interaction region 3610 of an in-line device 3601, as shown in FIG. 36. The micro-resonator 3603 may include a single mode fiber or multimode fiber as a lead-in fiber 3602, a beam 3605 coupled to the lead-in fiber, and a disc-shaped mass 3607 coupled to the beam, wherein the mass 3607 is provided in contact with the field interaction region. Other types of optical devices may be used to contact the field interaction region 3610.

In some embodiments, the field interaction region 110 may be a thin, fiber-like cylindrical structure that extends between the lead-in fibers 102, 104. For example, the field interaction region 110 may have a core of a same material (e.g., having a same refractive index) as the core 105 of one or both of the lead-in fibers 102, 104. In some embodiments, the field interaction region 110 may have a core having a same or substantially similar size (e.g., outer diameter) as one or more of the cores 105 of the lead-in optical fibers 102, 104. In the depicted embodiment, the outer dimension of the field interaction region 110 is substantially constant between the lead in fibers 102, 104. Diameter of the core 111 may be between about 1 μm and about 70 μm, for example. Other core dimensions may be used. The field interaction region 110 may be manufactured from a suitable optically transmissive material, such as silica or doped silica. Preferably, the composition of the core 111 may be substantially the same as the core of at least the lead-in fiber 102.

In another aspect, the in-line optical device 101 may comprise a void region 112 (e.g., a non-solid region or free space) extending between ends of the two lead-in optical fibers 102, 104 to enable a component, material (e.g., fluid), and/or interaction device (e.g., interaction device 207) to interact with, couple to, or engage with the field interaction region 110. The void region 112 may have one or more radial openings (e.g., openings 112A, 112B) provided in the in-line optical device 101. In some embodiments, the radial openings (e.g., radial openings 112A, 112B) may be provided on opposite sides of the field interaction region 110. In some embodiments, more than two radial openings are provided, such as shown in the FIG. 1E embodiment, which has four radial openings 102A-102D. The number of radial openings may include one, two, three, four, or even five or more, for example. The radial openings (e.g., 112A, 112B) may extend radially inward from the outer radial perimeter of the in-line device 101 to the field interaction region 110. In some embodiments, the non-solid void 112 is configured to substantially surround the field interaction region 110. The one or more radial openings 112A, etc. and non-solid void 112 allow a material, device, or component of the interaction device 207 (See FIG. 2A-2B) to have unimpeded access to the field interaction region 110.

Figure 3A:
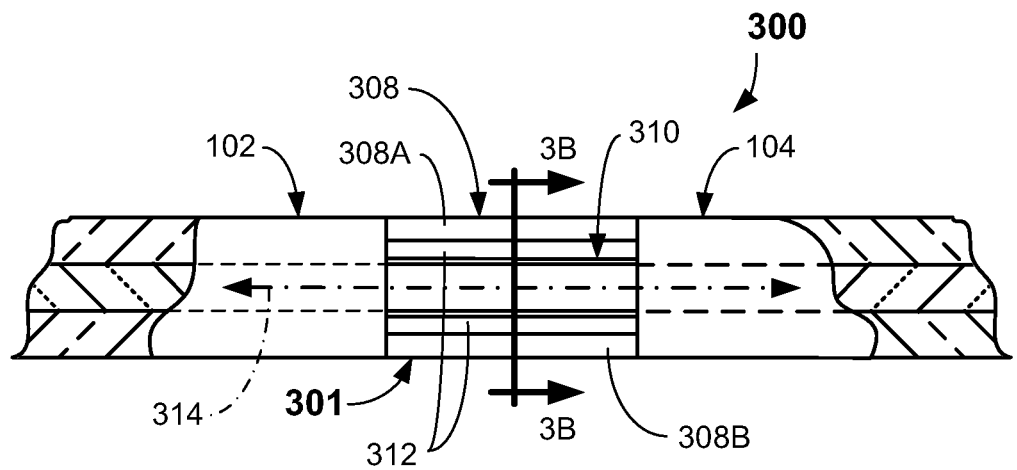
FIG. 3A illustrates a partially cross sectioned side view of another embodiment of an in-line optical device coupled between two lead-in fibers according to another aspect of the invention.
Figure 3B:
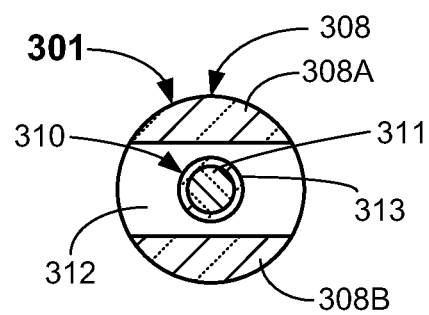
FIG. 3B illustrates a cross sectioned view of the in-line optical device of FIG. 3A taken along section lines 3B-3B.

In some embodiments, the optical field interaction region 110 may include a single material constituting a core 111 that may be in direct interaction and contact with the non-solid void 112. In other embodiments, such as shown in FIGS. 3A and 3B, the core 311 may be entirely surrounded by a cladding 313, which may be relatively thin. For example, the cladding 313 may have a radial thickness of less than about 2 μm, for example. Other thicknesses may be used. The cladding 313 may, in some embodiments, extend along the full length of the field interaction region 310. As will be understood, the radial thickness of the cladding 313 may be tuned. Additionally, the cladding 313 may function as a barrier layer during a manufacturing process of the in-line optical device 301, as will be described later herein. The cladding 313 may be a substantially-pure silica material, for example. In some embodiments, active chemical or biological layers can be utilized to form various biological or chemical sensor devices. In this case, functional materials can be applied to the surface of field interaction region 310 that will concentrate analyte at the surface of the field interaction region and thus initiate or amplify change of transmission properties of in-line device 301.

As is shown in FIG. 2A, an optical system 200A including an interrogation system 202 and an optical device 100 including an in-line optical device 101 of the invention may be provided. The system may be an optical sensing system in some embodiments. In the depicted embodiment, the lead-in fiber 102 is interconnected to the interrogation system 202 either directly, or by way of an additional length of optical fiber coupled to the lead-in fiber 102, and the lead-in fiber 104 is shown as truncated (e.g., cleaved) a short distance (e.g., 1 m or less) after the in-line device 101. However, other lengths may be used. The interrogation system 202 may be any conventional system adapted to send, receive, and process light signals. For example, the interrogation system 202 may include an optical coupler 203, a sending unit 204 (e.g., a suitable laser such as a diode laser, tunable laser diode, or light emitting diode), and a receiving unit 205 (e.g., a detector such as a InGaAs or Si detector or even more complex optical devices such as tunable filter or optical spectrum analyzer), and a controller/analyzer 206 adapted to cause light signals to be sent to, and process light signals received from, the optical device 100. Methods and apparatus for sensor interrogation are well known in the art and will not be discussed further herein.

In some embodiments, an interaction device 207 may function to interact with the field interaction region 110 of the in-line optical device 101. For example, the interaction device 207 may function to produce an optical signal that may interfere to some extent with an optical field passing through the field interaction region 110. In other embodiments, the interface device 207 may include a chamber or container adapted to contain a fluid (liquid or gas) which may contact and/or surround the field interaction region 110. The fluid may be stationary or be provided with a fluid flow rate past the field interaction region 110 and through the container or chamber, for example. In some embodiments, the fluid may be a biological fluid having biological properties that are desirous of being measured. The interaction device 207 may include any suitable interface structure, material, or device such as a solid material, fluid, liquid, fiber structure, micro-structure, or nano-structure. The interaction device 207 may include portions that may surround or encircle the field interaction region 110. The interaction device 207 may include light sending units (e.g., lasers, light emitting diodes, etc.) and/or receiving units (e.g., sensors, detectors, etc.) or combinations thereof. In another example, the interaction device 207 may be a micro-optical component such as a thin disc or micro-ball made of optically transparent material, which forms optical micro-resonator. An edge of the thin micro-disc or micro-ball can be provided in contact with field interaction region 110 to couple optical field with the modes of micro-resonator. Such fiber-coupled resonators have various uses such as filters, micro-laser or micro-lasers components, chemical or biological sensors, or similar devices. Interaction device 207 may be a more complex device, such as an optical planar waveguide circuit or lab-on chip device. Field interaction region 110 may provide coupling of the lead-in fiber 102 with waveguides or lab-on chip structures. Furthermore, other micro-devices such as a thin slice of thin-film-filter may be inserted within field interaction region. It will be understood by the person skilled in the art that there are many different micro-optical devices or micro-fluidic devices that can be effectively coupled to the optical fiber through filed interaction region of in-line device.

Figure 2B:
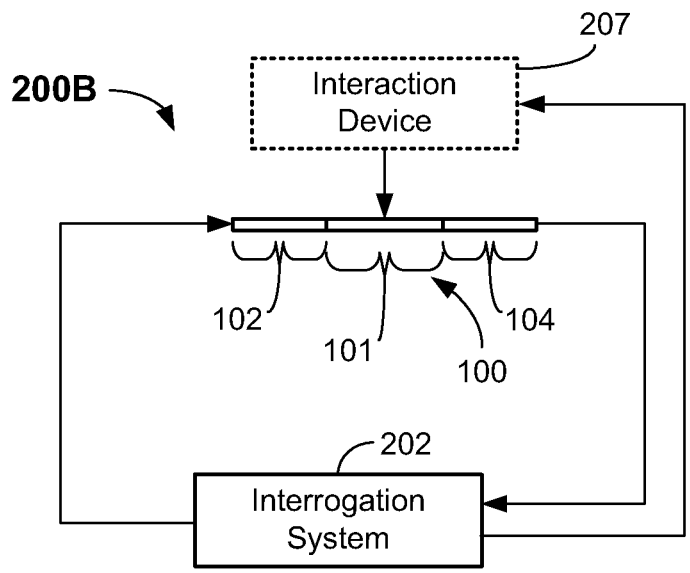
FIG. 2B illustrates a block diagram of an embodiment in-line optical device included in an alternate embodiment of optical system according to aspects of the invention.

In another aspect, as shown in FIG. 2B, the optical sensing system 200B may include an interrogation system 202 as heretofore described. However, the lead-in fiber 104 may not be truncated, but may be interconnected to the interrogation device 202 directly or by a suitable length of optical fiber such that the light signals are received at the lead-in fiber 102 and exit in the lead-in fiber 104. This is in contrast to the FIG. 2A embodiment, where the light signals are both sent and received (e.g., reflected) through the lead-in fiber 102.

Figure 4:
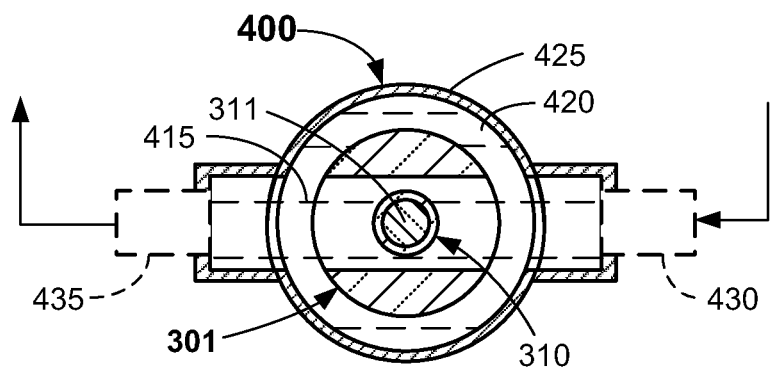
FIG. 4 illustrates a partially cross sectioned end view of another embodiment of an in-line optical device wherein the field interaction region is surrounded by a fluid according to another aspect of the invention.

In another embodiment, as depicted in FIG. 4, an optical system 400 is shown. The optical system 400 includes a field interaction region 310 surrounded by a fluid 415 that is contained in a chamber 420 of a container 425. The fluid 415 may be a liquid for which a property is to be determined. Fluid 415 may be static within the chamber 420 or may dynamically flow through the chamber 420 from and entrance to an exit (both not shown). Flow may be steady state or varying over time. Optional sending and receiving components 430, 435 may be provided. In some embodiments, a temperature of the fluid 415 may be determined. In other embodiments, a flow rate of the fluid 415 may be determined. In other embodiments, a property of the fluid may be determined. For example, a chemical composition, refractive index, or thermodynamic properties of the fluid might by assessed or measured.

Again referring to FIG. 1A, in some embodiments, various dopants may be introduced into the field interaction region 110 of the in-line optical device 101. The dopants may function to increase an optical loss of a core 111 of the field interaction region 110, and, thus, may permit localized heating of the inner optical field interaction region 110 by delivering optical power through one or both of lead-in fibers. This localized heating may be sensed by an interaction device 207 or otherwise be sensed by the interrogation system 202. The extent of heating may be influenced by a material exposed to the field interaction region 110 or a chemical reaction may be initiated or measured thereat. Highly localized heating may be used to initiate or promote a chemical reaction within a fluid or material in contact with the field interaction region 110. Heating and simultaneous measurement of the temperature of the field interaction region 110 may yield thermodynamic data on fluid, such as heat conduction and related properties. In some embodiments, a fluid flow may be measured by observation of heat conduction from the heated field interaction region.

Now referring to FIGS. 3A-3B, another embodiment of optical device 300 containing the in-line optical device 301 is shown. The in-line optical device 301 includes a field interaction region 310 adapted to interact through an evanescent field according to an aspect of the present invention. The in-line optical device 301 includes a support structure 308 having support elements 308A, 308B spaced from a central axis 314 that can be of any practical shape, as explained earlier. The in-line optical device 301 also includes an inner optical field interaction region 310 that, in the depicted embodiment, includes a core 311 and relatively thin cladding 313. The core 311 of the field interaction region 310 may, in some embodiments, have a different refractive index than the cladding 313. For example, the core 311 may consist of substantially-pure silica, and the cladding 313 may include a down-dopant material such as a fluorine dopant. Optionally, the core 311 may include an up-doping material such as germania, and the cladding 313 may be substantially-pure silica. The core 311 may have typically a same or substantially similar core size (e.g., diameter) as the core 105 of the lead-in fiber 102 or slightly larger (and also preferably the lead-in fiber 104) to allow for low loss optical coupling between the field interaction region 310 and lead-in fibers 102, 104. Furthermore, a refractive index magnitude and distribution of the core 311 may be substantially matched to the lead-in fibers 102, 104 to further minimize the optical losses of the in-line optical device 301. The cladding 313 may be sufficiently thin to provide a desired magnitude of the evanescent field at an outer surface of the cladding 313. This may allow for interaction between evanescent field of the guided optical field propagating in the core 311 and material, structure, or device interacting with and/or surrounding the field interaction region 310.

Typically, the field interaction region 310 may have a circular cross-section with an outer diameter, typically between about 0.5 μm to about 5 μm larger than the core 105 of the lead-in fiber 102. Cladding 313 can be also omitted as described earlier. The field interaction region 310 may provide good guidance of light between lead-in fibers, while the void 312 allows for interaction of the propagating field with material, structure, or device communicating with and/or surrounding the field interaction region 310.

In some embodiments, the field interaction region 310 may be surrounded, immersed, or covered by a thin film or multilayer films of active or otherwise functionalized material or materials (such as a nano-material, a reaction material, non-linear materials, temperature-sensitive material, thermochromatic material, or an absorbing material) that may influence the propagating field through evanescent field interaction, for example. Examples of such films or materials include immobilized enzymes in organic optical coatings, organic optical coatings with immobilized dies, and nanostructured coatings deposited using, for example, Langmuir- Blodgett and electro-static self-assembly techniques. Varieties of evanescent field sensors, including chemical and biochemical sensors, may be embodied in this way. Similarly, a metal layer or metal layers may be provided or deposited on an outer surface of field interaction region 310 to form a surface plasmon device. For example, metals including gold, platinum, and palladium may be provided. When application of metal or other material onto the surface of the field interaction region 310 is not circularly symmetric, polarization dependent devices, like for example in-line polarizers or other polarization devices may be produced.

In some embodiments such as shown in FIG. 4, a fluid measurement system 400 may be particularly useful to enable evanescent field interaction between a fluid 415 and the propagating field in the field interaction region 310. The fluid 415 may be a pure liquid, solution, suspension, dilution, or a gas. The fluid 415 may be provided in a suitable container 425 such that the fluid 415 surrounds the in-line optical device 301 and the field interaction region 310. In some embodiments, sensitive measurements of refractive index of the liquid 415 may be performed by immersion of in-line optical device 301 in the liquid 415 having refractive index substantially similar to the refractive index of the core 311 of the field interaction region 310. When the liquid 415 has a refractive index lower than that of the core 311 of the field interaction region 310, the guidance of the optical field between lead-in fibers 102, 104 will be good, but optical loss may increase when the refractive index of the fluid 415 exceeds the refractive index of the core 311. Thus, the degree of optical loss may be correlated to the refractive index of the fluid 415.

Figure 24:
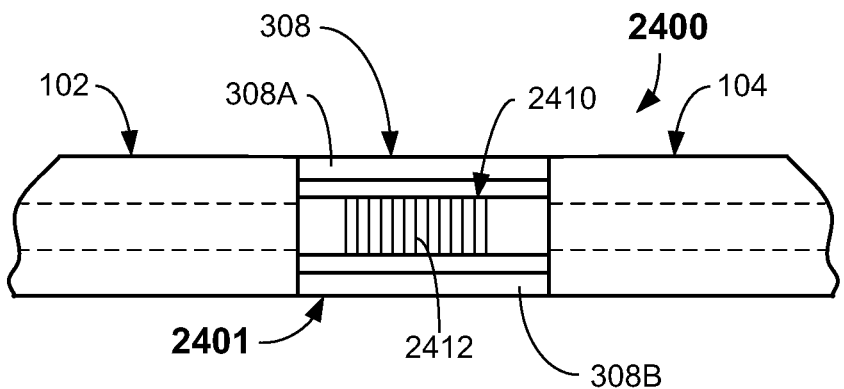
FIG. 24 illustrates a partially cross sectioned side view of in-line optical device that utilizes a fiber Bragg grating according to another aspect of the invention.

Furthermore, in some embodiments of the in-line device 301, field interaction region 310 may be covered by periodic layer of coating material to form grating devices (see optical device 2400 of FIG. 24). Such grating devices 2400 may be used as optical filters or optical sensors, for example. Even more complex micro-structures or nano-structures can be created on the outer surface of the field interaction region 310 to obtain more complex manipulation of the optical field. In general the described evanescent field in-line optical device 301 according to aspects of the invention, may replace devices based on biconic tapers. Such biconic taper devices are well known in the art, but are difficult to produce and may be relatively large in size.

Figure 5:
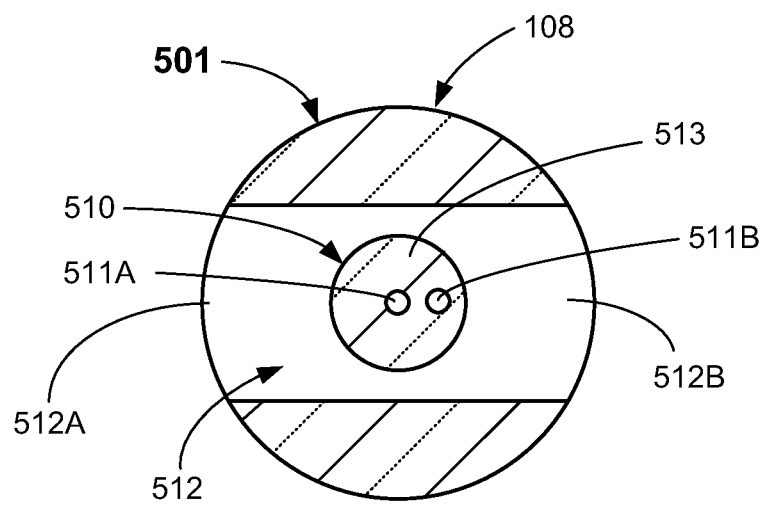
FIG. 5 illustrates cross sectioned end view of another embodiment of an in-line optical device including a field interaction region comprising a dual core according to an aspect of the invention.

Another embodiment of an in-line optical device 501 capable of interacting through an evanescent field while utilizing (sensitive) interferometric principle is depicted in FIG. 5. The in-line device may be coupled between lead-in fibers 102, 104 as in the previously described embodiments. The field interaction region 510 may consist of two closely spaced cores (e.g., cores 511A, 511B), with the first core 511A in a geometrical center of the field interaction region 510 and the second core 511B offset from the first core 511A and relatively closer to an outer surface border of the cladding 513. The second core 511B may in some embodiments even be in contact with outer border of the optical field interaction region 510. In further embodiment, multiple cores (e.g., 3 or more cores), core-ring formations (See FIGS. 29-30), or other waveguide structures may be provided. The field interaction region 510 may include a sufficiently thin cladding 513 that allows optical field interaction with an optical field passing through the field interaction region 510, for example. The optical interaction may be enabled or facilitated by a fluid (e.g., a liquid of known refractive index) or by optically-active layers optically coupled to the optical field interaction region 510.

Lightwave propagation within first core 511A is generally aligned with the core 105 of the lead-in fiber 102. The lead-in fiber 102 thus excites both symmetric and anti-symmetric modes of two core waveguide structure of the field interaction region 510. The optical power may beat between the centrally-located core 511A and side core 511B due to inference of the symmetric and anti-symmetric modes. The beat period depends largely on a phase constant difference between the modes. For example, variation of surrounding refractive index that predominately influences side core 511B, changes a phase constant of the mode that propagates in side core 511B, and, thus, the optical power beat period. The change in beat period may cause a change of transmission properties of in-line optical device 501 as the coupling to the lead-in fiber 104 depends on phase difference among symmetric and asymmetric mode at interface between field interaction system 510 and lead-in fiber 104. Thus, in some embodiments, the in-line device 501 may function as a refractometer. Optionally, by the addition of layers of one or more active materials to the outside surface of the field interaction region 510, a detectable response to a specific chemical reaction, analyte, or temperature may be provided.

An interferometric in-line optical device similar to the embodiment of FIG. 5 may be provided by providing a core-and-ring structure in the field interaction region. For example, a core of relatively high refractive index and the ring of relatively lower refractive index may be designed in such a way that the lead-in fiber 102 excites light in both the core and the ring (See FIGS. 29-30). The propagation of light in the ring will thus be affected by the surrounding medium (e.g., fluid). This may cause a phase change between modes traveling in the core and the ring. This may be detected as a change in optical signal intensity in the lead-in fiber 104 by an interrogations system coupled to the in-line optical device. The relative height, width and location of the ring may be changed to ensure a light mode traveling in the ring.

Figure 23:
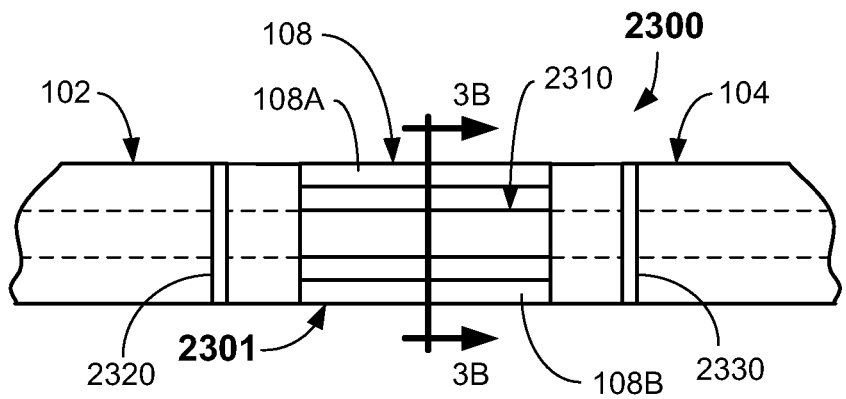
FIG. 23 illustrates a partially cross sectioned side view of in-line optical device that may be used as a fast response thermometer, refractometer, or flow meter according to another aspect of the invention.

In accordance with another aspect of the invention as best shown in FIG. 23, an optical temperature sensor device 2300 having relatively fast response time may be provided. Such fast response time optical thermometer devices 2300 may have applications in micro-fluidics, flow measurements, scientific analysis, flight control, and similar applications. When the field interaction region 2310 is made to have a relatively small cross-sectional dimension (e.g., diameter), this may allow a relatively fast heating and/or cooling of the field interaction region 2310 by a surrounding fluid, which may be gas or liquid in thermal contact with the field interaction region 2310. In accordance with this aspect, the field interaction region 2310 may be configured to exhibit temperature sensitivity. The temperature dependence of field interaction region 2310 may be achieved in different ways.

In a first embodiment of optical thermometer device 2300, the in-line optical device 2301 may have a cross section that is the same as shown in FIG. 3B. The field interaction region 2310 is composed of core 311 that has similar or equal diameter (or slightly larger) to the core 105 of the lead-in fiber 102 and includes a relatively thin cladding 313. For example, a radial thickness of the cladding 313 may be less than about 10 µm, for example. The core 311 may be made of a relatively temperature dependent material. Temperature dependence may be achieved by introduction of dopants that exhibit temperature dependent absorption, fluorescence, or thermochromic properties. For example, the core 311 may be silica that is doped with a material such as vanadium, chromium, or a rare earth element. For example, vanadium doping of the core 311 may increase substantially the optical loss and this loss may also exhibit temperature dependence. Vanadium in concentrations between 0.01 and 3 mol % can be typically used for these purposes. In such configuration, the transmission loss of the in-line optical device 2301 becomes temperature dependent. Alternatively, the field interaction region may be covered by film of temperature sensitive material. A temperature-induced change in refractive index of such material can be used to modulate the losses of the structure. This loss may be measured via any known interrogation system that is optically coupled to the optical temperature device 2300. Fluorescence can be used in similar way when core 311 is doped with fluorescing ions, such as chromium ions. In this case, the lead-in fiber 102 is used to excite core 311 and collect fluoresced light. Typically the light intensity decay after short excitation pulse is measured to determine the temperature.

In another embodiment, a Fabry-Perot sensor may be created by formation of two fiber mirrors 2320, 2330 within or closely situated to the field interaction region 2310 as depicted in FIG. 23. In this case temperature dependence of the silica refractive index can be utilized as temperature transducer mechanism. The mirrors 2320, 2330 may be formed by deposition of a $TiO_2$ coating as described in U.S. Pat. No. 4,848,999, or by in fiber cavity formation as described in the paper entitled "Low-loss semi-reflective in-fiber mirrors," Opt. Express 18, 12017-12026 (2010) or by creation of fiber Bragg gratins near the device active region. The cross section of the in-line optical device 2300 is otherwise the same as described with reference to FIG. 3B.

Optionally, in some embodiments more complex optical structures may be included in or on the field interaction region, such as structures with gratings (e.g., Bragg gratings) formed along the field interaction region as shown in FIG. 24). In FIG. 24, an optical device 2400 including an in-line optical device 2401 is provided wherein the field interaction region 2410 is formed to include a fiber Bragg grating 2412. The fiber Bragg grating 2412 may be imprinted directly into the field interaction region 2410 by intense UV radiation to make this region temperature sensitive or even refractive index sensitive. Fiber Bragg gratings are very standard devices. The dimensions (e.g., length and period) of the Fiber Bragg gratings will vary based upon the application. However, the dimensions and design of fiber Bragg gratings are well understood by those of skill in the art, and will not be described further herein. Other means for causing the field interaction region to be temperature sensitive may be used.

In-line optical devices according to present invention may also be configured as an interferometric Fabry-Perot refractive index sensor. The design is similar to in-line temperature sensors discussed above and is also best represented by the structure of FIG. 23. The optical device 2300 includes the support structure 108, lead-in fibers 102, 104, and optical field interaction region 2310. Optical field interaction region 2310 may further consist of core 311 and thin cladding 313. However a radial thickness of the cladding 313 is preferably smaller than in a temperature sensor (e.g., 2 µm or less) or may even be completely omitted. This assures interaction between guided optical field and the surrounding medium through evanescent field interaction. Two fiber mirrors 2320, 2330 may be embedded within optical interaction region 2310 or just before and after the in-line optical device 2310 to form an in-line Fabry-Perot cavity. The fiber mirrors 2320, 2330 may be constructed as described above. The optical length of Fabry-Perot cavity thus depends on the surrounding medium's refractive index through evanescent field interaction between the optical field and the surrounding medium. Cavity length can be interrogated by various known optical or opto-electronic signal processing techniques.

The in-line optical device according to another aspect of the present invention may be configured as a fluid flow sensor. The principle of operation for the device is flow dependent heat conduction from a heated field interaction region when exposed to the fluid flow. The heating of the field interaction region causes its temperature to rise. The equilibrium temperature under steady state conditions depends on the field interaction region geometry, power absorbed into the field interaction region, and heat conduction from the field interaction region, which depends on the flow velocity of the fluid that surrounds the in-line optical device.

Embodiments of the fast response time optical temperature devices, described above with reference to FIG. 23, may also be adapted to detect or measure a flow of a fluid that passes through the in-line optical device 2301 by heating a temperature sensitive region of the in-line optical device 2301. More precisely, flow measurement is accomplished by heating of the field interaction region 2310. The heating of the field interaction region 2310 may be achieved by introduction of one or more dopants, discussed above, coupled with an application of an optical source with higher power that may cause high optical absorption in the core 311 of field interaction region 2310. Typically optical sources (e.g., semiconductor laser sources) with power output of between few tens of milliwatts and few hundreds of milliwatts are suitable for such applications. Small dimensions (e.g., outer diameter) of the field interaction region 2310 may provide relatively short response times and high sensitivity of optical device 2300 to fluid flow. Alternatively, heat may be generated in the vicinity of field interaction region 2310. For example, one of the lead-in fibers 102, 104 may be doped with dopant that causes high optical absorption at a location in close proximity to the field interaction region 2310.

In another aspect, a more complex optical fluid flow device 2600 is illustrated in FIG. 26. The fluid flow device 2600 may include a first lead-in fiber 2602 having dual cores, semi-reflective mirror 2630, support structure 108 (e.g., 108A, 108B), tapered region 2640, second lead-in fiber 2604, and an optical field interaction system 2610 containing three miniature rods 2611. These rods 2611 may be arranged within a single plane (e.g., horizontal plane) as shown by cross-sectional view of the device shown in FIG. 26C. Each rod 2611 contains a waveguide structure, e.g. a core and a cladding (not shown). The central rod core may be doped with dopant that strongly increases optical absorption. Dopants such as vanadium and cobalt may be used. Dopant levels of between about 0.05 and 3 mol % or more in silica may be provided. Other absorbing materials may be used. This central rod is heated by delivery of high optical power thereto. This may be achieved through the second lead-in fiber 2604, for example. The side rods may have relatively low loss cores and may each be connected to respective ones of the cores of the dual core lead-in fiber 2602. The dual core lead-in fiber 2602 includes a tapered region 2640, preferably close to the field interaction region 2610, to bring cores of the dual core lead-in fiber 2602 relatively close to each other so as to cause optical coupling between the cores. In this configuration, a Michelson interferometer having each arm positioned sidewise to the heated central rod is formed. The coupling between the cores can be also achieved by other means than tapered region 2640, such as by introduction of special waveguide structure within dual core lead-in fiber that will cause coupling among both cores. When the central rod of the field interaction region 2610 is heated, the presence of fluid flow thereat will cause an appearance of the temperature difference among both side rods. This temperature difference may generate an optical path length variation measurable by the interferometric setup, which may be detected by a suitable interrogation system.

Figure 25A:
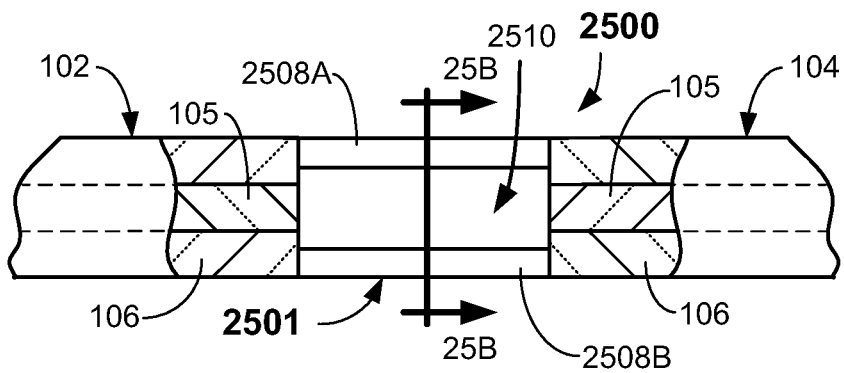
FIG. 25A illustrates a partially cross sectioned side view of in-line optical device including a field interaction region comprising a void, wherein the in-line optical device may be used as a micro cell according to another aspect of the invention.
Figure 25B:
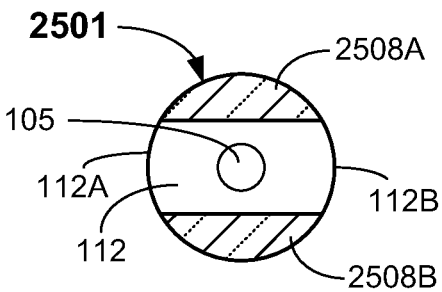
FIG. 25B illustrates a cross sectioned end view of in-line optical device of FIG. 25A taken along section line 25B-25B.
Figure 25C:
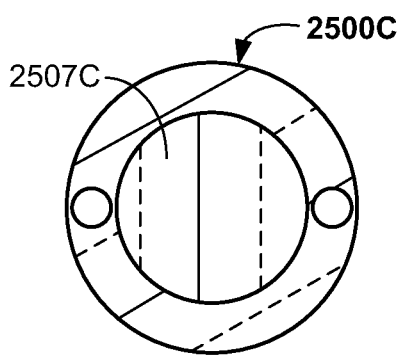
FIGS. 25C-25G illustrates cross sectioned end views of alternate structure-forming fibers that may be used to manufacture alternative embodiments of in-line optical devices according to another aspect of the invention.
Figure 25D:
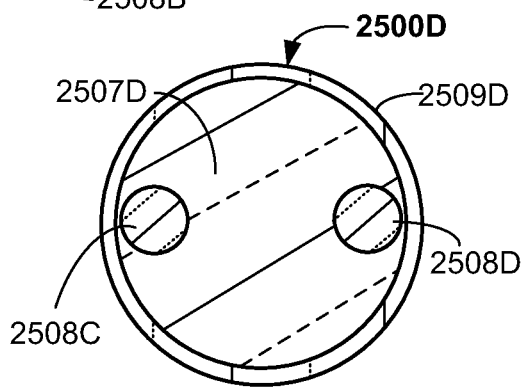

In another embodiment shown in FIG. 25A-25B, an optical device 2500 including an in-line optical device 2501 may function as an absorption micro-cell. The optical device 2500 may include lead-in fibers 102, 104 and support structure made up of spaced first and second support structures 2508A, 2508B. The field interaction region 2510 in this embodiment is constituted of a non-solid void extending longitudinally between the end surfaces of lead-in fibers 102, 104. Primarily, the absorption micro-cell allows for materials such as optical active solids, liquids, gases, vapors, suspensions, or the like to enter or be placed in the proximity of the field interaction region 2510 between two lead-in fibers 102, 104. Coupling the optical device to an interrogation system thereby allows for measurement of the optical absorption or refractive index of the materials in the field interaction region 2510. In case of refractive index measurements, semi reflective surfaces may optionally be added on the end surfaces of the lead-in fibers 102, 104 or separate mirrors as described herein may be created within lead-in fibers 102, 104 close to the micro-cell. This forms a Fabry-Perot cavity that can provide high measurement sensitivity of the micro-cell.

Figure 18A:
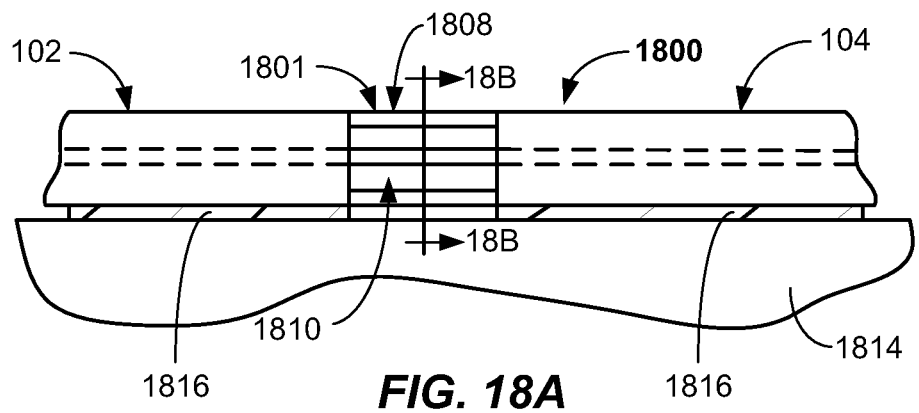
FIG. 18A illustrates a side view of an in-line optical strain measurement device according to another aspect of the invention.
Figure 18B:
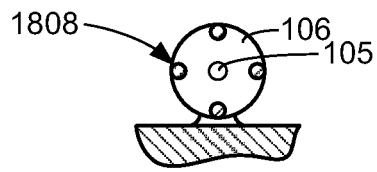
FIG. 18B illustrates a cross sectioned end view of the in-line optical strain measurement device of FIG. 18A taken along section line 18B-18B.

In another aspect of the present invention as depicted in FIG. 18A-18B, an in-line optical device 1800 including an in-line optical device 1801 may be configured to function as a miniature strain measurement device exhibiting relatively high sensitivity to applied strain while exhibiting low impact on the surrounding/measurement environment. In this embodiment, the in-line optical device 1801 is coupled between lead-in fibers 102, 104 each having a core 105 and a cladding 106 as before described, and includes a field interaction region 1810 aligned between the cores 105, which is in this case is a non-solid void (e.g., an air space) extending between the ends (e.g., cores 105) of the lead-in fibers 102, 104. One or more support structures 1808 (e.g., four rods shown) function as active flexing elements that are deformed axially during operation of the optical device 1800. When external strain (compression or extension) is imposed on an object 1814 to which the optical device 1800 is adhered by suitable adhesive members 1816 (e.g., an epoxy adhesive) or other securing means, the support structures 1808 are stretched or compressed axially along their lengths. The change in axial length of an optical cavity of the device 1800 may be optically measured by an interrogation system optically coupled to the optical device 1800. The optical cavity may be formed by suitable semi-reflective surfaces or mirrors on the ends of the lead-in fibers, i.e., on either end of the field interaction region 1810, or optionally by semi-reflective mirrors formed in the lead-in fibers (such as shown in FIG. 23). The advantage of this design is that since silica has a relatively high Young modulus, sensors having all bulk silica and reflective mirrors of the prior art, might significantly reinforce the structure, and, thus, may influence the structure and measurement thereof. This may be irrelevant if the strain is measured on the large object (bridge, car, airplane structure, etc.), but for example if straining must be measured on the surface of small device or device that is made of material with relatively low Young modulus, the stiffness of a bulk silica fiber sensor might considerably interfere with and limit strain of the observed object. Thus, the reading of the prior art bulk silica sensor will be lower than in structure containing no such sensor. So it should be apparent that using the present optical device reduces the influence of the sensor on the surrounding environment.

Figure 18C:
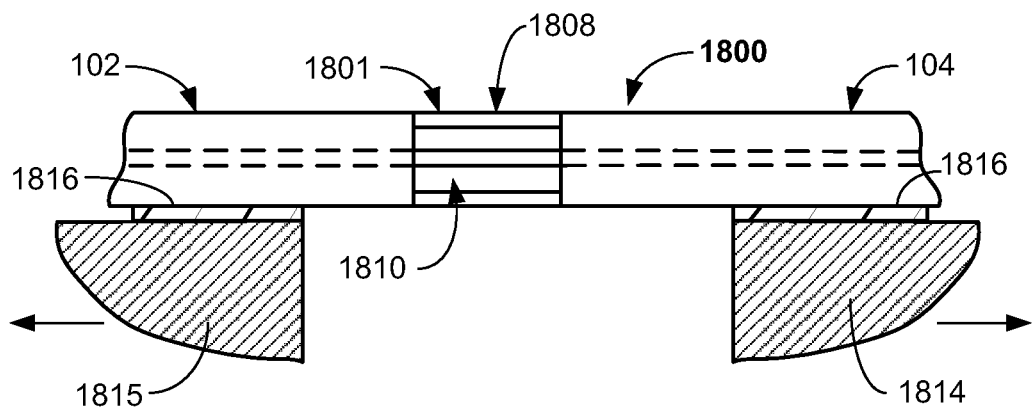
FIG. 18C illustrates a side view of an in-line optical elongation measurement device according to another aspect of the invention.

FIG. 18C illustrates an embodiment where the optical device 1800 is attached between two relatively moveable objects 1814, 1815 (e.g., at discreet points thereof) and embodied as an elongation sensor. Each lead-in fiber 102, 104 is adhered by suitable adhesive members 1816 (e.g., an epoxy adhesive) or other securing means to the relatively moveable objects 1814, 1815. As the objects 1814, 1815 move relative to each other as shown by arrows, the support structures 1808 are stretched axially along their lengths. The change in axial length of an optical cavity of the device 1800 may be optically measured by an interrogation system optically coupled to the optical device 1800.

Figure 19A:
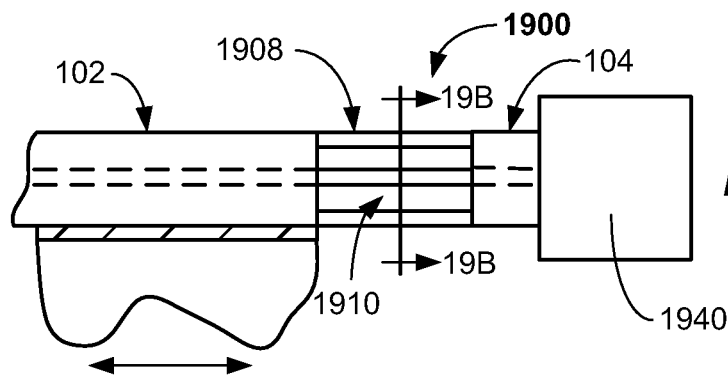
FIG. 19A illustrates a side view of an in-line optical acceleration measurement device according to another aspect of the invention.
Figure 19B:
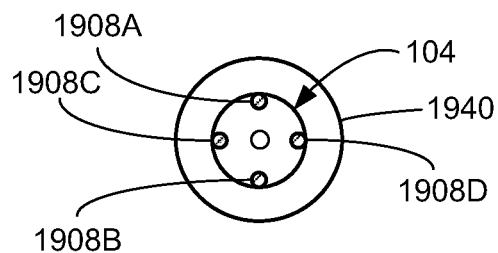
FIG. 19B illustrates a cross sectioned end view of the in-line acceleration measurement device of FIG. 19A taken along section line 19B-19B.

In accordance with another aspect, an accelerometer embodiment is shown in FIGS. 19A-19B. The optical accelerometer device 1900 includes a lead-in fibers 102, 104, support structure 1908 extending between the lead-in fibers 102, 104 and field interaction region 1910, which is in this particular case is a non-solid void (e.g., an air space) defined between the respective surfaces of lead-in fibers 102, 104. In this described embodiment, both semi-reflective end surfaces of the lead-in fibers 102, 104 define the ends of an optical cavity in the field interaction region 1910. Optionally, mirrors may be provided in the lead-in fibers 102, 104 as above described. The support structure 1908 may include a plurality of support members 1908A-1908D. The support members 1908A-1908D may be cylindrical rods with diameter of few micrometers, for example. One, two, but preferably three or more support members are suggested to minimize sensitivity of the optical device 1900 to lateral forces and accelerations. In the depicted optical device 1900 being configured as an accelerometer, one of the lead-in fibers (e.g., lead-in optical fiber 104) is cleaved or otherwise shortened. This shortened piece of lead-in fiber 104 acts as an inertial mass that will expand or contract the structure members 1908A-1908D when exposed to an axial acceleration thereby causing an axial length of the optical cavity to change. The mass of the short piece of lead-in fiber 104 may be further increased (e.g., tuned) by bonding additional weight 1940 to the lead-in fiber 104 to increase an axial sensitivity of the optical device 1900. The change in length of the optical cavity may be determined by various interrogation techniques that are well known in the art.

Figure 20A:
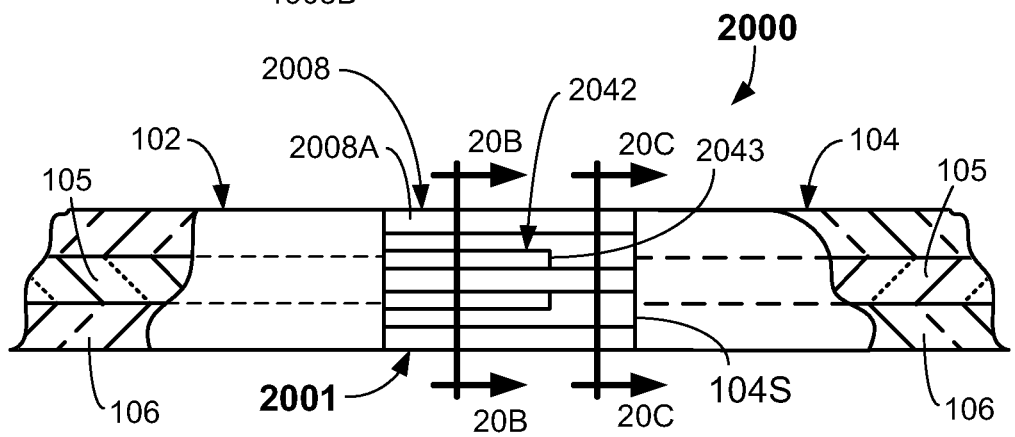
FIG. 20A illustrates a partially cross sectioned side view of an in-line optical device according to another aspect of the invention.
Figure 20B:
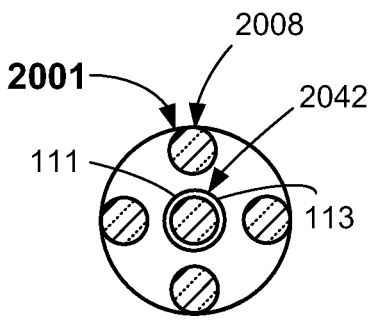
FIG. 20B illustrates a cross sectioned end view of the in-line optical device of FIG. 20A taken along section line 20B-20B.
Figure 20C:
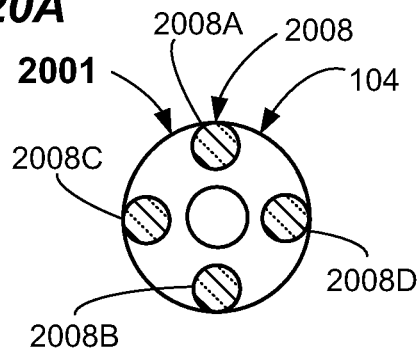
FIG. 20C illustrates a cross sectioned end view of the in-line optical device of FIG. 20A taken along section line 20C-20C.

In the embodiments described in FIGS. 18A-18B and 19A-19B, beam divergence at the forward end of the lead-in fiber 102 may limit the practical length of the support structures and thereby limit overall sensitivity of the optical devices 1800, 1900. To minimize such losses associated with unwanted beam divergence and also allow for provision of relatively longer support elements, an embodiment of optical device 2000 as is illustrated in FIGS. 20A-20C may be provided. The optical device 2000 may include lead-in fibers 102, 104 each having a core 105 and a cladding 106 as herein described, and an in-line optical device 2001 coupled between the lead-in fibers 102, 104. A waveguide element 2042, that in the depicted embodiment, may be a solid rod containing core 111 with relatively higher refractive index than a cladding 113 to provide light guidance therein. The waveguide element 2042 is optically coupled to the core 105 of the lead-in fiber 102. An optical cavity is defined between a terminal end surface 2043 of the waveguide 2042 and the end surface 104S of the lead-in fiber 104. Support structure 2008 may include structure elements 2008A-2008D, as previously described. However, a length thereof may be made appreciably longer thereby providing improved sensitivity of the optical device 2000. Length of the structure elements 2008A-2008D may be between about 50 μm and about 10,000 μm, for example. The optical cavity length may be between about 2 μm and about 40 μm, for example. Thus, in this embodiment, it should be apparent that the optical cavity length between ends 104S and 2043 may be made relatively small and the strained structure 2008 may be relatively large.

Many variations of the embodiment of FIGS. 20A-20C are possible. For example, when the optical device 2100 is configured as an accelerometer as shown in FIGS. 21A-21C, only the lead-in fiber 102 including a core 105 and cladding 106 is used for guiding of the light, and only reflected optical power is observed. In this instance, in-line optical device 2101 may be simplified. For example, the waveguide structure of the previous embodiment may be omitted, and a solid rod 2142 without any waveguide properties may be provided in its place. The solid rod 2142 may be a cylindrical rod of substantially-pure silica. The optical cavity is formed between the end surface 2143 of the solid rod 2142 and the end surface 102S of the lead-in fiber 102. The optical cavity length may be between about 2 µm and about 40 µm, for example. The support structure 2108 includes structure elements 2108A-2108D. Length of the structure elements 2108A-2108D may be between about 50 µm and about 10000 µm, for example. The solid rod 2142 is attached to the lead-in fiber 104 that is not used for the light transmission, which may be substantially shortened. As in the previous accelerometer embodiment of FIG. 19A-19B, a weight 2140 may be attached to the lead-in fiber 104 if the mass of the lead-in fiber 104 is insufficient.

In another embodiment of optical device 2200, shown in FIGS. 22A-22D, the in-line optical device 2201 includes two rods 2242A, 2242B. The first rod 2242A and a second rod 2242B include end faces that are separated by the gap that defines an optical cavity. The length of the optical cavity is as described above for the embodiment of FIGS. 21A-21C. Support structure 2208 is also as previously described. At least one of two rods (e.g., rod 2242A) should contain a waveguide structure. For example, the rod 2242A may include a core 111 and a cladding 113 as shown in FIG. 22B. Rod 2242A may be connected, and optically coupled, to the lead-in fiber 102 that delivers the light from the interrogation system. Rod 2242B may be a solid silica rod, for example. Lead-in fiber 104 may be terminated (e.g., cleaved). The in-line device 2200 may be used for strain sensing or acceleration measurement via addition of a suitable mass to lead-in fiber 104 should it be of insufficient mass.

In accordance with another aspect of the invention, a method for manufacturing an in-line optical device according to embodiments of the present invention is provided. With reference to FIGS. 6-7 and FIGS. 15A-15F, the method 1500 includes various steps and not necessarily in the listed order. The method 1500 includes in 1502, providing a first lead-in fiber (e.g., 102), and optionally forming a substantially planar end on the first lead-in fiber in 1504. The method 1550 further includes providing a structure-forming fiber (e.g., 600) in 1506, and optionally forming a substantially planar end on the structure-forming fiber in 1508. The substantially planar ends may be substantially perpendicular to a longitudinal axis of the fibers 102, 600. The structure-forming fiber (e.g., 600) may have an optical glass structure. For example, the structure-forming fiber (e.g., 600) may be a glass rod having an outer diameter substantially equal to an outer diameter of the lead-in fiber 102. Small diameter differences (e.g., 10% or less) may also be used. The structure-forming fiber (e.g., 600) may include a selectively etchable profile (e.g., a dopant profile) that allows the structure-forming fiber to be selectively reshaped by exposure to an etchant medium as will be explained further below. The etching process causes the structure-forming fiber (e.g., 600) to be reshaped into a complex three-dimensional structure. In particular, any of the structures of in-line optical devices described herein including, for example, a support structure and field interaction region may be formed by the present method 1500.

In 1510, the optional substantially planar end on the structure-forming fiber (e.g., 600) is bonded to the optional substantially planar end on the first lead-in fiber 102. In 1512, the structure-forming fiber (e.g., 600) is shortened to a predetermined length that may correspond to a desired length of the field interaction region. The shortening may be accomplished by cleaving, cutting or breaking and polishing, or other suitable means. A substantially planar end may be optionally formed on shortened end of the structure-forming fiber 600. In 1514, a second lead-in fiber 104 is provided. A substantially planar end of the second lead-in fiber 104 is optionally formed in 1516 to form substantially planar end surface that is substantially perpendicular to a longitudinal axis of the lead-in fiber 104. In 1518, the second lead-in fiber 104 is bonded (e.g., by splicing) to the structure-forming fiber (e.g., 600) on an end opposite from the first lead-in fiber 102 to form an assembly containing the first lead-in fiber 102, the structure-forming fiber (e.g., 600), and the second lead-in fiber 104. In 1520, the structure-forming fiber (e.g., 600) of the assembly is etched to form the final shape of the in-line optical device (e.g., 701). The inline device may include a field interaction region (e.g., 710), support structure (e.g., 708A, 708B), and void (e.g., 712). In some embodiments, the field interaction region may comprise a non-solid void.

As should be understood, even more complex in-line optical devices may be provided wherein more than a single section of a same or different structure-forming fiber may be bonded between the respective first and second lead-in fibers 102, 104. For example, another structure-forming fiber may be bonded to the shortened structure-forming fiber in the manufacturing method 1500 described above. Furthermore, the sequence of the steps above serves as an example, and their order may be modified or changed to optimize the manufacturing method 1500. For example, lead-in fibers 102, 104 or even structure-forming fiber (e.g., 600) and their ends may be prepared in advance in large batches. Moreover, bonding may take place all at once or in a different order.

The bonding between various fibers may be performed by fusion splicing, for example. Examples of fusion splicing may include arc fusion splicing, filament fusion splicing, and laser fusion splicing. Other suitable splicing methods may be used. The end preparation of the optional substantially planar end surface of the fibers 102, 104, 600 and shortening may be performed by mechanical cleaving, laser cleaving, cutting, breaking and polishing, or other methods.

The etching medium may be a liquid etching medium, such as hydrofluoric acid, buffered hydrofluoric acid, or in gas medium such as $SF_6$. For example, 10-50% hydrofluoric acid at room temperature can be used to perform etching of the optical devices within about 1 to 60 minutes. Other suitable etching mediums may be employed. In some embodiments, the termination of etching process may be time controlled. In other embodiments, optical feedback from an interrogation system optically coupled to and interrogating the in-line optical device (e.g., 700) during the manufacture may be utilized to terminate the etching process. For example, the process may be terminated when a desired optical structure has been created according to established predetermined optical criteria. This feedback may include transmission, reflection, or any other optical property observation by optically coupling to one or both lead-in fibers 102, 104 to assure better uniformity, repeatability, and yield from the method of manufacturing the in-line optical device.

Figures 6, 7:
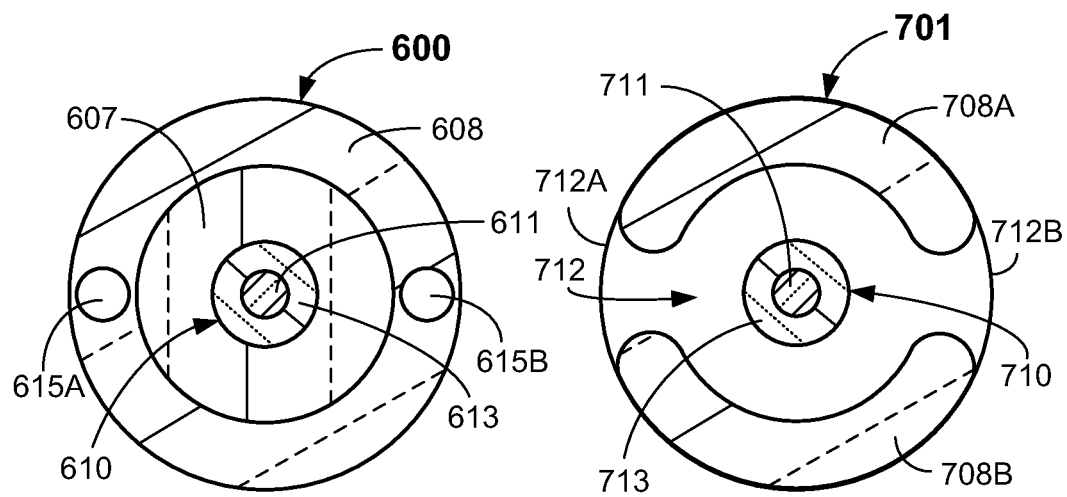
FIG. 6 illustrates a cross sectioned end view of an embodiment of a structure-forming fiber used to form an in-line optical device of FIG. 7 according to an aspect of the invention.
FIG. 7 illustrates a cross sectioned end view of an embodiment of an in-line optical device formed following etching of the structure-forming fiber of FIG. 6 according to an aspect of the invention.

Referring now to FIGS. 6 and 7, manufacture of a particular embodiment of in-line optical device 701 is described. It should be recognized that other in-line optical devices may be produced using the described methods. The selective reshaping of the structure-forming fiber 600 by etching into the complex three dimensional structures disclosed herein is achieved by inclusion of a preferentially-etchable region 607 within the structure-forming fiber (e.g., 600). The preferentially-etchable region (e.g., 607) is adapted to etch at higher etching rate than the surrounding material. The difference in etching rate between the preferentially-etchable region 607 and other material comprising the structure-forming fiber 600 determines the achievable structure created by the manufacturing method. Accordingly, methods of the invention, in some embodiments, may include providing a dopant composition for the preferentially-etchable region 607 that significantly increases an etching rate of that region 607 as compared to the other regions or portions of the structure-forming fiber 600. In the depicted embodiment, the preferentially-etchable region 607 may include at least a portion of the volume where a void 712 in the in-line optical device 701 is to be formed.

In one aspect, as will be described with reference to FIGS. 6 and 7, the etching rate may be increased by introduction of dopants into at least a portion of the preferentially-etchable region 607 (e.g., intermediate annulus) of structure-forming fiber 600 that effectively increases the etching rate of the material in that annulus 607 as compared to the other regions (e.g., outer cladding 608 and interaction region forming portion 610). In another aspect, void elements, such as voids, holes, porosity, bubbles, macro-capillaries, micro-capillaries, or nano-capillaries may be provided in at least a portion of the preferentially-etchable region 607 of structure-forming fiber 600. In yet another aspect, micro-cracks may be provided in at least a portion of the preferentially-etchable region 607 of structure-forming fiber 600. Combinations of the aforementioned may also be provided. Such void elements and micro-cracks will be described more fully below and aid in increasing a relative etching rate of the material including them.

The following detailed description relates to silica-based fiber; however described principles can be also applied to other type of fibers. While germania is a common dopant used widely in fiber production to increase the refractive index of the glass in a core of an optical fiber, its impact on etching rate is generally moderate. According to an aspect of the invention, in order to significantly increase the etching rate of germania-doped silica in comparison to pure silica, a relatively high concentration of germania must be used. For example to increase germania-doped silica etching rate in hydrofluoric acid by approximately ten times or more as compared to pure silica, a germania molar concentration in silica would need to be approximately 25 mol % or more in silica. At such high germania doping levels, significant stress buildup may be witnessed in the optical fiber perform used to manufacture the fiber. Accordingly, this may make manufacturing the fiber difficult.

While the germania doping can be used to produce one or more of the present in-line optical devices, in a preferred implementation of the invention other dopants may be used to significantly increase an etching rate at considerably lower dopant concentrations and thereby provide lower stress build up. In particular, a phosphorus pentoxide ($P_2O_5$) dopant may be used to significantly increase an etching rate of the $P_2O_5$-doped silica at relatively lower molar concentrations as compared to equivalent rates with germania-doped silica. $P_2O_5$-doped silica may, for example, etch up to 100 times faster than substantially-pure silica at doping levels that are still convenient for practical fiber manufacturing.

Thus, in accordance with an aspect of the invention, a very useful, ten times or more etching rate increase as compared to the etching rate of germania-doped silica may be achieved when only approximately 4.5% mol or more of $P_2O_5$ is present in the silica glass of the preferentially etchable region 607 of the structure-forming fiber 600. Other dopants may be used to achieve enhanced etching rate of the preferentially-etchable regions such as $B_2O_3$, $GeO_2$, or the like. However, the increase in the etching rate of the silica in these cases may carry problems of internal stress build-up and achieve etching rates that are considerably less favorable than in case of phosphorus pentoxide etching. Accordingly, it is preferred that the preferentially-etchable region 607 of the structure-forming fiber 600 may be doped with approximately 3% mol to 10% mol or more of $P_2O_5$ in silica. The outer cladding 608 forming the support structure (e.g., 708A, 708B) may be an annulus of substantially-undoped silica. By the term substantially undoped or substantially-pure silica as used herein, it is meant that less than about 2 mol % of a dopant may be provided in silica.

In more detail, shape, cross-sectional dimensions, and optical functional properties of in-line optical devices described herein are determined by the design of the structure-forming fiber (e.g., 600) and the etching conditions (etching medium composition, temperature, time, and agitation condition) that are used. As a part of the manufacturing method, upon exposure (e.g., immersion) of the structure-forming fiber 600 (duly spliced in-between two lead-in fibers 102, 104) to the etching medium, the preferentially-etchable region 607 of the structure-forming fiber 600 may be selectively etched to produce the target (desired) shape of the in-line optical device 701. The preferentially-etchable region 607 that exhibits a high etching rate as compared to the structure forming portion 608 and interaction region forming portion 610 will be preferentially removed. Accordingly, a final configuration of the in-line optical device 701 will be largely determined by the position of the regions that exhibit relatively low etching rates, as these regions will function as etchant barriers. For example, the etchant barriers will comprise the inner surface of the structure forming portion 608, the outer surface of the interaction region forming portion 610, and the claddings 106 at the ends of the lead-in fibers 102, 104.

In more detail, a method of forming an in-line optical device 701 according to an aspect of the invention will now be described. To create an in-line optical device 701, a structure-forming fiber 600 having a cross section as shown in FIG. 6 may be provided. The structure-forming fiber 600 may include an outer structure forming portion 608 that may be substantially-pure silica, a preferentially-etchable region 607 that may be doped with a dopant (e.g., $P_2O_5$) that exhibits an enhanced etching rate as compared to substantially-pure silica, and a interaction region forming portion 610 that may include a core 611 and inner cladding 613. The inner cladding 613, if provided, may include a thickness of between about 0.5 and about 4 μm, for example. The core 611 may be doped with any dopant that increases the refractive index of the silica, like for example germania. Germania doping of the core 611 of between about 3 and 30 mol % in silica, or even 5 and 25 mol % in silica may be provided, for example. In some embodiments, the core 611 may substantially matched to the parameters of the core 105 of one or both of the lead-in fibers 102, 104. For example, the core 611 may have a substantially same refractive index, a substantially same core diameter (or slightly larger), and a substantially same numerical aperture to minimize optical loss between lead-in fibers 102, 104 and the field interaction region 710 of the in-line optical device 701. The diameter of the core 611 may be between about 3 μm and 70 μm, for example. The numerical aperture of the core 611 may be between about 0.08 and about 0.3, for example.

To assure proper formation of the support structure 708A, 708B during the etching process, the circular symmetry of the structure-forming fiber 600 needs to be broken in order to allow selective, non-symmetric removal of radial portions of the support structure forming portion 608 to form radial openings 712A, 712B. To assist in the preferential removal of portions of the support structure forming portion 608 during etching, void elements 615A, 615B (e.g., side capillaries) may be provided in the support structure forming portion 608. When the structure-forming fiber 600 is exposed to the etching medium, the support structure forming portion 608 will be first removed uniformly until the etching medium penetrates and reaches the void elements 615A, 615B. Upon penetration of the void elements 615A, 615B, the etching medium will continue to remove material around the circumference of the support structure forming portion 608 and also within inner surfaces of the void elements 615A, 615B. The etching medium will quickly reach the preferentially-etchable region 607 at the inner side of void elements 615A, 615B. Once the etching medium comes in contact with preferentially-etchable region 607 it will start to remove doped material at a rapid rate. Since the etching rate of the preferentially-etchable region 607 can be ten or more times, or even 30 or more times higher than pure silica, the selective removal of preferentially-etchable region 607 will be performed within relatively short period of time. Within the same time interval, the removal of support structure forming portion 608 will be relatively slow, and, thus, limited. After removal of the entire preferentially-etchable region 607, a significant part of the support structure forming portion 608 will therefore remain intact and will form the support structure 708A, 708B of the in-line optical device 701 as shown in FIG. 7.

Furthermore, the inner cladding 713 of substantially-pure silica will prevent immediate penetration of the etching medium to the core 711 that is also doped and can be potentially effectively attacked by the etching medium. The role of the inner cladding 613 is to slow the etching rate of the interaction region forming portion 610, and, thus, allow better controlled formation of the field interaction region 710. The inner silica cladding 713 may also be used to fine tune optical properties of the field interaction region 710, such as for example the strength of the evanescent field at the outer surfaces of the field interaction region 710.

In some embodiments, regions adjacent to where the void elements 615A, 615B are provided in FIG. 6 may be replaced or supplemented by doped silica (e.g., $P_2O_5$-doped silica) that is preferentially etched at high rate upon exposure to etching medium. The structure-forming fiber 600 may be formed using a convention optical fiber drawing techniques. The performs (boules) from which the optical fiber is drawn may be, in the FIG. 6 embodiment, be formed by conventional inside or outside deposition methods, rod-in tube, stack and draw methods, or the like. Upon consolidation, the preform may be drilled or otherwise machined to form suitably sized holes in the preform that will form the void elements 615A, 615B upon drawing of the perform into the structure-forming fiber 600.

Figure 8:
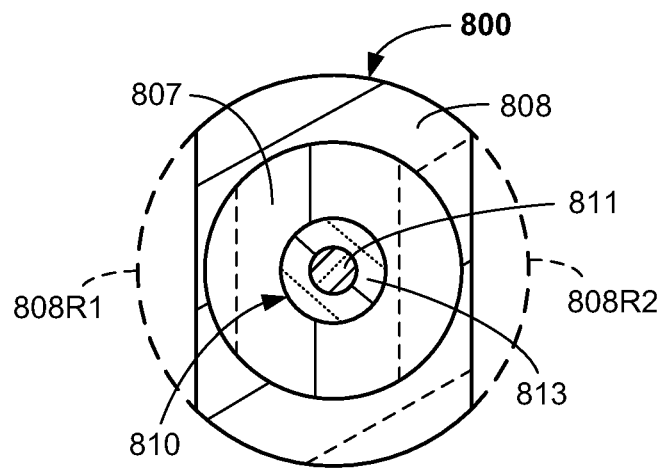
FIG. 8 illustrates a cross sectioned end view of another embodiment of a structure-forming fiber used to form an in-line optical device according to an aspect of the invention.
Figures 9, 10:
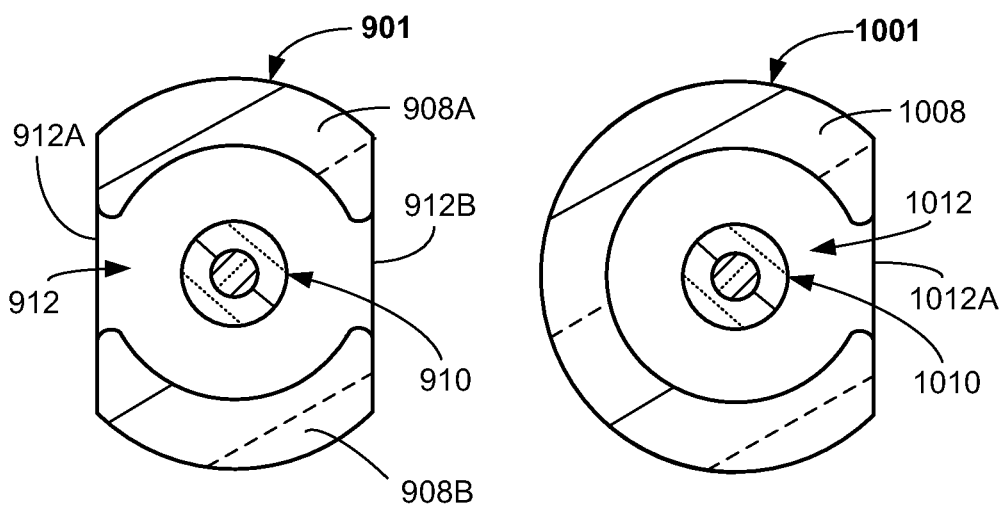
FIG. 9 illustrates a cross sectioned end view of an embodiment of an in-line optical device formed following etching of the structure-forming fiber of FIG. 8 according to an aspect of the invention.
FIG. 10 illustrates a cross sectioned end view of an embodiment of an alternative in-line optical device formed following etching of a structure-forming fiber according to an aspect of the invention.
Figure 38:
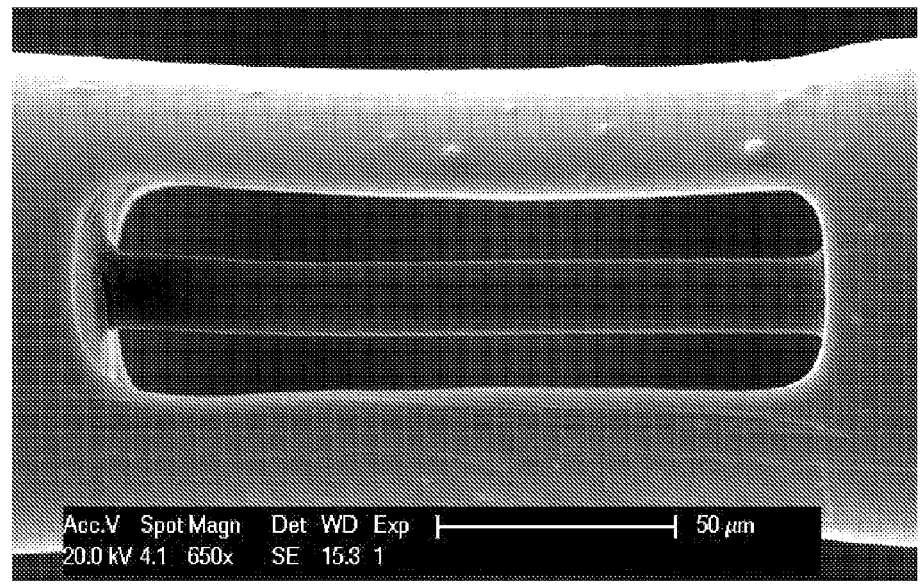
Figure 39:
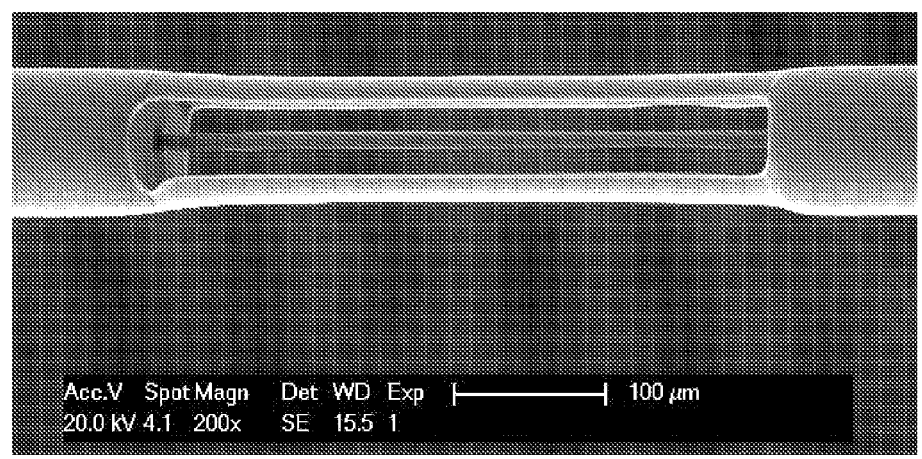

In other embodiments, as is illustrated with reference to FIGS. 8-10, localized full or partial removal of at least some of the outer portion of fiber (or deviation from a round shape) used to form the structure-forming fiber 800 may aid in a faster removal of the preferentially-etchable region 807. For example, one or more outer portions of the drawn fiber may be removed. In the depicted embodiment, the missing or removed portions may be located at diametrically opposed portions, for example. The removed portions 808R1, 808R2 are shown as dotted in FIG. 8. The one or more portions 808R1, 808R2 may be removed by any suitable means, such as mechanical grinding or polishing, or cutting by the use of a $CO_2$ laser, picoseconds laser, or femtosecond laser. Otherwise, side portions may be removed from the preform by mechanical grinding or polishing, cutting, or by the use of a laser, and then the structure-forming fiber 800 may be drawn under conditions where the portions 808R1 and 808R2 are missing, i.e., condition that maintains the cross sectional shape shown in FIG. 8. Accordingly, the structure forming portion 808 of the structure-forming fiber 800 may have a non-circular cross-sectional profile or shape. If both portions 808R1, 808R2 are removed/missing, then the resulting cross-sectional profile of the in-line optical device 901 may be as shown in FIG. 9. In the depicted embodiment, the in-line optical device 901 includes support structures 908A, 908B, field interaction region 910, and void 912. In the depicted embodiment, the void 912 substantially completely surrounds the field interaction region 910. In the depicted embodiment, the outer cladding 808, and, thus, the support structures 908A, 908B may have a composition of material that exhibits a substantially slower etching rate in the etching medium than the preferentially-etchable region 807. For example, the outer cladding 808 may be substantially-pure silica. The preferentially-etchable region 807 of structure-forming fiber 800 may be doped with a dopant (e.g., $P_2O_5$) that exhibits an enhanced etching rate (e.g., 10 times or more, 20 times or more, or even 30 times or more) as compared to the etching rate of substantially-pure silica in a common etching medium. Thus, the outer cladding 808 functions as a barrier to etching such that a much defined profile of the void 912 may be formed. The interaction region forming portion 810 may include a core 811 and cladding 813. The cladding 813 may include a thickness as described above, for example. The core 811 may be doped with any dopant that increases the refractive index of the silica. Germania doping of the core 811 as described above may be provided. In some embodiments, the parameters of the core 811 may substantially matched to the core parameters of the lead-in fibers 102, 104, as discussed above. As should be apparent, removal of one or more external portions 808R1, 808R2 will allow the etchant medium to etch to the preferentially-etchable region 807 more quickly and form radial openings 912A, 912B. FIGS. 38-39 illustrate micrographs of actual exemplary embodiments of optical devices as described in FIG. 9 according to an aspect of the invention.

In the example where only one portion (e.g., portion 808R2) is removed, the resulting profile of the in-line optical device 1001 may be as shown in FIG. 10. In particular, the support structure 1008 may partially encircle the field interaction portion 1010, except for a local arc segment at the opening 1012A of less than about 180 degrees, or even less than 90 degrees, for example. As in the previous embodiment, the void 1012 may substantially surround the field interaction region 1010. The materials used to form the in-line optical device 1001 may be the same as previously described.

The preform used to form the structure-forming fiber 800 in this embodiment may be formed by any suitable method, such as a rod-in-tube method, outside vapor deposition (OVD, inside chemical vapor deposition such as modified chemical vapor deposition (MCVD) or plasma chemical vapor deposition (PCVD), or the like. Preform members forming the field interaction region forming portion 810, preferentially-etchable region 807, structure forming portion 808 are provided and consolidated. The resultant preform may be drawn into the structure-forming fiber 800 using conventional fiber drawing methods. Other preform-forming methods may be used.

In another embodiment, as described with reference to FIGS. 11 and 12, an in-line optical device 1201 is formed by using a structure-forming fiber 1100, shown in FIG. 11. The circular symmetry of the structure-forming fiber 1100 is broken by provision of one or more offset discrete, support structure forming portions 1108A. Optional additional portions 1108B, 1108C, 1108D (shown dotted) may be provided into the structure-forming fiber 1100. A preferentially-etchable region 1107 substantially surrounds the field interaction forming region 1110, which may include a core 1111 and cladding 1113 that are the same as described in the previous embodiments. In this embodiment, the structure-forming fiber 1100 may optionally include a relatively thin layer of outer cladding 1109 (shown dotted), preferably of substantially-pure silica.

In some embodiments, the support structure forming portions 1108A, 1108B, 1108C, 1108D may be manufactured from substantially-pure silica, for example. The outer cladding 1109 may be relatively thin (approx. 10 µm or less) or may be entirely omitted. It may, however, be beneficial to have at least a thin layer of outer cladding 1109 of substantially-pure silica on the outer portion of the structure-forming fiber 1100 to simplify bonding (e.g., fusion splicing) of the lead-in fibers 102, 104 and the segment of structure-forming fiber 1100 according to an aspect of the manufacturing method. The support structure forming portions 1108A, 1108B, 1108C, 1108D may have any suitable cross-sectional shape, such as circular, elliptical, rectangular, etc. Other cross-sectional shapes may be used. At least one, but preferably two, three, four, or more such support structure forming portions may be provided in the cross-sectional profile of the structure-forming fiber 1100 as shown in FIG. 11. Optional positions for additional support structure forming portions 1108B, 1108C, 1108D are shown as dotted. In each, a central axis of the support structure forming portions 1108A, 1108B, 1108C, 11408D is offset from the central axis of the field interaction region 1210.

Figure 12:
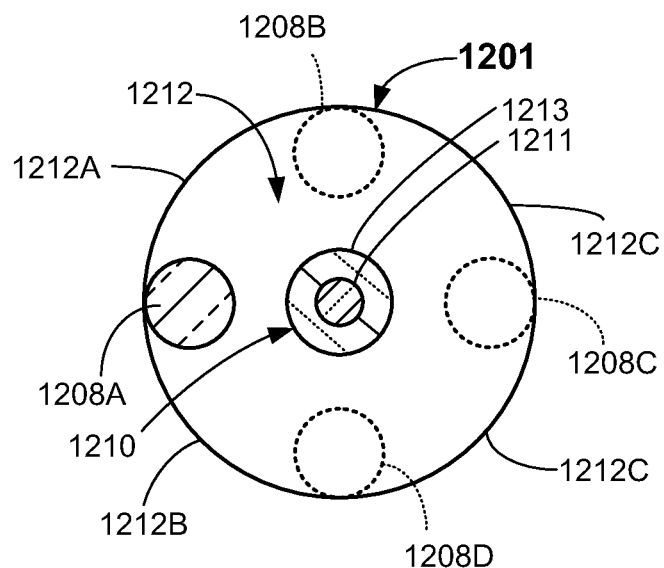
FIG. 12 illustrates a cross sectioned end view of an embodiment of an in-line optical device formed following etching of the structure-forming fiber of FIG. 11 according to an aspect of the invention.

In the depicted embodiment, when the structure-forming fiber 1100 is exposed to (e.g. surrounded by) the etching medium for a sufficient time, an in-line optical device 1201 as shown in FIG. 12 is formed. The etching medium will first remove the optional outer cladding 1109, if provided, followed by rapid removal of preferentially-etchable region 1107, leaving behind the one or more support structures 1208A (and 1208B, 1208C, 1208D, in any combination, if provided), the field interaction region 1210, and void 1212. The void 1212 substantially surrounds the field interaction region 1210. Multiple radial openings 1212A-1212D are formed that extend to the field interaction region 1210. The field interaction region 1210 may include a core 1211 surrounded by a cladding 1213. The one or more support structure forming portions 1108A, upon etching, thus form the one or more support structures 1208A (and possibly additional one or more support structures 1208B, 1208C, 1208D).

The preform used to form the structure-forming fiber in this embodiment may be formed by any suitable method as described above (e.g., rod-in-tube, MCVD, PCVD, OVD, or the like) wherein preform members forming the field interaction region forming portion 1110, preferentially-etchable region 1107, and outer cladding 1109 (if provided) are provided and consolidated. Manufacture of the produced preform may be followed by machining holes to receive rods forming support structure forming portions 1108A (and 1108B, 1108C, 1108D, if provided) which may be substantially-pure silica rods. The resultant preform may again be consolidated and drawn into the structure-forming fiber 1100 using conventional fiber drawing methods. Other preform forming methods may be used.

Figure 13:
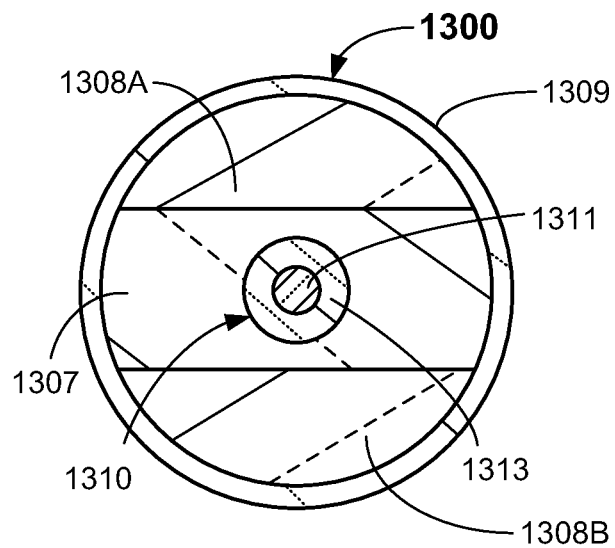
FIG. 13 illustrates a cross sectioned end view of another embodiment of a structure-forming fiber used to form an in-line optical device according to an aspect of the invention.

In another embodiment, the structure-forming fiber 1300 includes circular non-symmetry. For example, a preferentially-etchable region 1307 extends across (cross-wise) through the structure forming fiber 1300 as shown in FIG. 13. The structure forming portions 1308A, 1308B comprise approximately quarter moon shaped sections each having a cylindrical outer surface segment and a planar inner surface. An outer cladding 1309 of substantially-pure silica may be provided. Similarly, field interaction forming portion 1310 including core 1311 and cladding 1313 may be provided. The field interaction forming portion 1310, preferentially-etchable region 1307, and structure forming portions 1308A, 1308B may be formed of the materials previously described. Similarly, as explained above, the initial uniform etching of the outer cladding 1309 will continue until the high etching rate materials of the preferentially-etchable region 1307 is reached. The preferentially-etchable region 1307 will then upon be rapidly removed upon exposure to the etching medium, while the structure forming portions 1308A, 1308B and field interaction region forming portion 1310 will remain. Accordingly, an in-line device 1401 is formed having approximately quarter moon shaped support structures 1408A, 1408B each having a cylindrical outer surface segment and a planar inner surface, field interaction region 1410, and void 1412 substantially surrounding the field interaction region 1410. The void 1412 includes two openings 1412A, 1412B each extending radially inward from the outer perimeter of the in-line device 1401 to the field interaction region 1410. The void 1412 also extends axially to the ends of the lead-in fibers 102, 104.

The preform used to form the structure-forming fiber 1300 in this embodiment may be formed by any suitable assembly method such as described above. The preform members forming the field interaction region forming portion 1310 and preferentially-etchable region 1307 are formed any consolidated into one consolidated member. This consolidated member may then cut and machined or ground to remove sides thereof and assembled into the annular outer cladding 1309 along with quarter moon preform members forming the structure forming portions 1308A, 1308B. This assembly may be consolidated and drawn into the structure-forming fiber 1300 using conventional fiber drawing methods. Other preform forming methods may be used.

In another aspect, introduction of void elements, such as voids, holes, porosity, bubbles, macro-capillaries, micro-capillaries, or nano-capillaries may be formed in the structure-forming fiber. For example, such void elements may be provided in the preferentially-etchable portions described above. The void elements may considerably increase an average etching rate of the portion including them when exposed to the etching medium. In some embodiments, void elements such as macro-capillaries having diameters of between about 10 µm and about 30 µm may be introduced. Similarly, micro-capillaries having diameters of between about 1 and about 10 µm may be introduced. In other embodiments, nano-capillaries having diameters of between about 0.01 and about 1 µm may be introduced. The capillaries may be produced by rod-in-tube stacking of thin silica tubes, preform drilling, or other suitable methods. In some embodiments, such void elements may be conveniently introduced into the structure-forming fiber to break the circular symmetry of the structure forming fiber that is provided to achieve formation of the support structures, voids, and/or field interaction region in the resultant in-line device. The void structures may be the sole means for achieving a relatively higher etching rate of the preferentially-etchable portion, or the differential doping of the preferentially-etchable portion may be used in combination with the addition of void structures.

Figure 28:
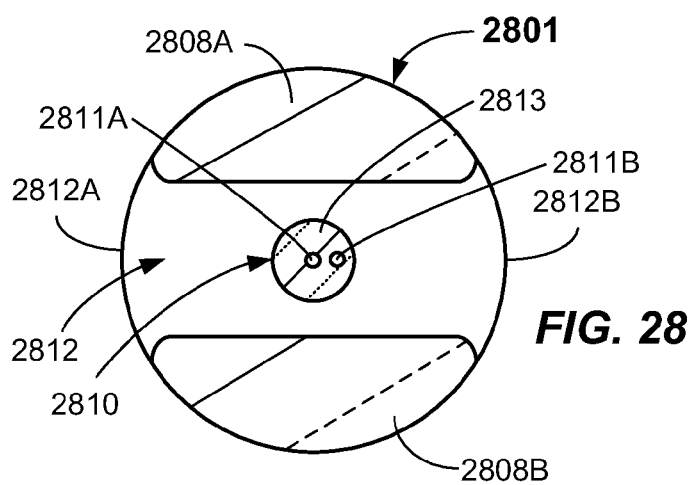
FIG. 28 illustrates a side view of an embodiment of in-line optical device including dual cores according to an aspect of the invention.

The embodiments of structure-forming fibers for creation of an interferometric optical evanescent field device may be similar to the case of optical evanescent field devices described above except that a dual, multiple, or ring-and-core structure may be introduced into the field interaction region of the structure-forming fiber instead of a simple step or graded index core and cladding waveguide structure. In the case of an interferometric optical evanescent field device such as shown in FIG. 28, dual core, multiple core, or a ring-and-core structure may be included in a field interaction region and may be included in a cladding of relatively lower etching rate (e.g., substantially-pure silica). Other features of the structure-forming fiber intended for formation of support structures may be the same as in case of an optical evanescent field device.

Figure 27:
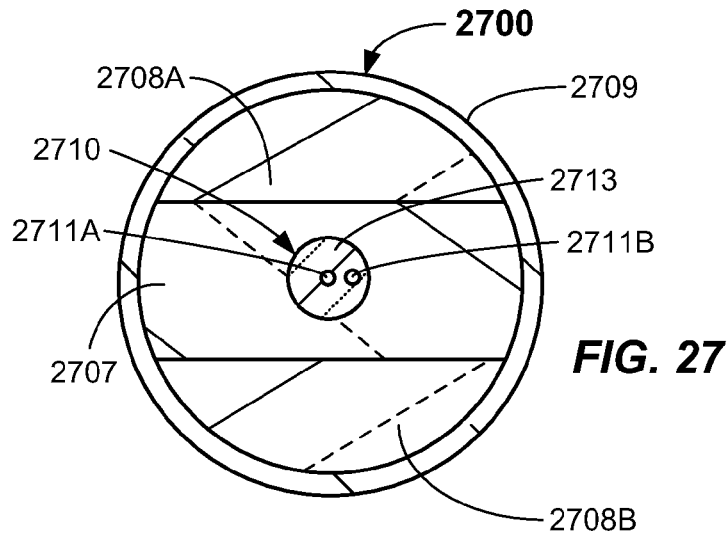
FIG. 27 illustrates a cross sectioned end view of a structure-forming fiber that may be used to manufacture the in-line optical device of FIG. 28 according to another aspect of the invention.
Figure 29:
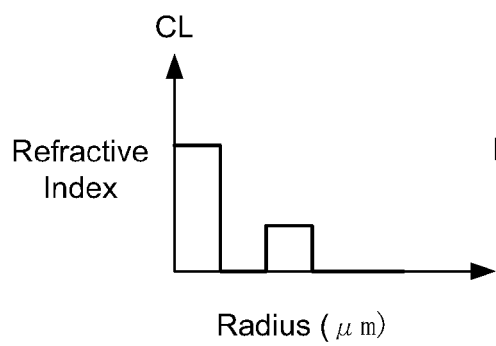
FIGS. 29 and 30 illustrate refractive index profiles of alternate embodiments of in-line optical device including core and ring structures according to an aspect of the invention.
Figure 30:
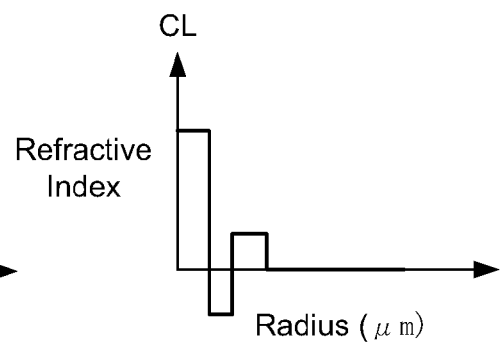

An example of a structure forming fiber 2700 intended for the manufacture of a dual-core interferometric optical evanescent field device 2801 of FIG. 28 is shown in FIG. 27. The first core 2711A is positioned into the center of the structure-forming fiber 2700 to allow simple and low loss splicing with lead-in fiber 102, 104. The second core 2711B is positioned on the side of the field interaction region forming portion 2710 and close to the edge of low etching rate inner cladding 2713. As in the previous embodiment, a low etching rate cladding 2709 may be provided. Similar to explanation above, the initial uniform etching of the cladding 2709 (e.g., substantially-pure silica) will continue until the relatively higher etching rate material of the preferentially-etchable portion 2707 is reached by the etching medium. Then, the removal will proceed at a rapid rate until the etching boundaries (borders) of the structure forming portions 2708A and field interaction region forming portion 2710 are reached. The resultant dual-core interferometric optical evanescent field device 2801 is shown in FIG. 28. The optical device 2801 includes quarter moon shaped support structures 2808A, 2808B each having a cylindrical outer surface segment and a planar inner surface, field interaction region 2810, and void 2812 substantially surrounding the field interaction region 2810. The void 2812 includes two openings 2812A, 2812B each extending radially inward from the outer perimeter of the in-line device 2801 to the field interaction region 2810. In the depicted embodiment, the field interaction region 2810 includes dual cores 2811A, 2811B having diameters between about 4 µm and about 15 µm. The centerlines of the cores 2811A, 2811B may be spaced by between about 4 µm and about 15 µm. The field interaction region 2810 may include more than two cores in some embodiments, or the dual-core field interaction region 2810 may be replaced with a core-and-ring structure having a refractive index profile as is shown in FIG. 29 or FIG. 30, for example, where the refractive index is plotted against the radius of the fiber (from the centerline (CL) of the fiber). In this case core and ring refractive index and dimensions shall be selected in a way that the lead-in fiber 102 excites a core and ring modes in predetermined proportions. The actual dimension and refractive index parameters are to be selected according to the device function and wavelength.

Figure 11:
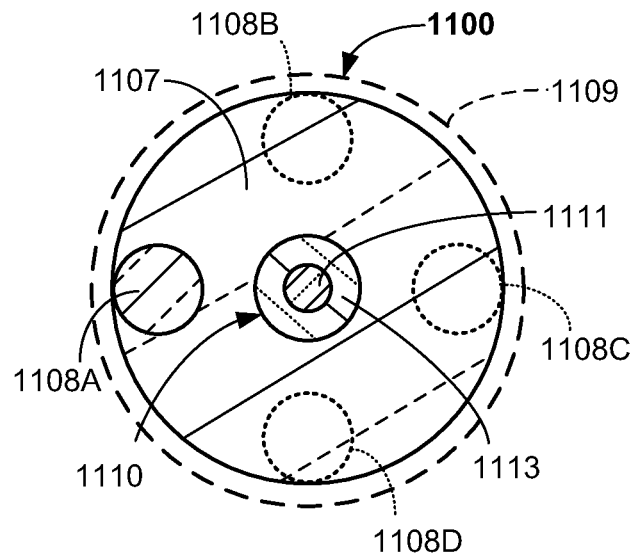
FIG. 11 illustrates a cross sectioned end view of another embodiment of a structure-forming fiber used to form an in-line optical device according to an aspect of the invention.

An example of a first structure-forming fiber 1100 for production of an embodiment of the optical accelerometer device 3100 of FIG. 31 is shown in FIG. 11. The structure forming portions 1108A-1108D may be less than about 20 µm in diameter, to allow for their axial expansion and/or contraction at relatively low values of longitudinal force or acceleration. The optical accelerometer device 3100 is manufactured by bonding two different structure-forming fibers as shown in FIG. 32. FIG. 32 illustrates a side view of the bonded fiber assembly 3200 before exposure to the etching medium. The first structure-forming fiber 1100 (FIG. 11) and the second structure-forming fiber 3300 are bonded in-between lead-in fibers 102 and 104. The second structure-forming fiber 3300 may be the same as the first one, except that the core and inner cladding are omitted as shown in FIG. 33. When the assembly 3200 is exposed to the etching medium, preferentially-etchable portions 1107, 3307 are removed leaving behind lead-in fibers 102, 104, support structures 3108 (which comprise support structure forming portions 3208A-3208D and 1108A-1108D, which are precisely aligned), and solid rod 3142 having a waveguide structure as heretofore described with an optical cavity located between an end of the solid rod 3142 and the lead-in fiber 104 as shown in FIG. 31. In this embodiment, the core 1111 of the first structure-forming fiber 1100 may be doped with a dopant that increases its refractive index but has relatively little impact on the etching rate thereof. Such dopants may be, for example, alumina or titania. This is desirable, since the forward end of the core 1111 becomes exposed for a short time to the etching medium, and use of low etching rate material for the core 1111 may help to preserve good optical quality of the front semi-reflective surface. Titania doping may be in an amount of between 0.5 and 5 mol % in silica. $Al_2O_3$ may be doped between about 2.5% and 15% in silica.

Optionally, the design of the second structure-forming fiber 3300 may be replaced with a design utilizing a circularly symmetric structure such as shown in FIG. 34. The second structure-forming fiber 3400 may, for example, be composed of circularly symmetric pure silica outer cladding 3409 and circularly symmetric preferentially-etchable region 3407. When this structure-forming fiber 3400 is spliced together with the first structure-forming fiber 1100, the etching medium will penetrate the preferentially-etchable portion 3407 of the second structure-forming fiber 3400 from the end once the openings are formed in structure-forming fiber 1100.

To produce an optical device 2200 according to the embodiment shown in FIG. 22A-22B, three structure-forming fibers may be bonded in-between two lead-in fibers 102, 104 and then etched. In this case, the structure-forming fibers bonded directly to the lead-in fibers 102, 104 may utilize any fiber cross-section that includes a central core 1111, an inner cladding 1113, a preferentially-etchable portion 1107 and also low etching rate support structure forming portions 1108A-1108D as described in FIG. 11. The structure forming fiber that is positioned in the middle of the structure forming assembly may utilize the same design as the structure-forming fiber of FIG. 33. Less complex circularly symmetric structure-forming fiber as described previously in FIG. 34 may also be utilized as the middle structure-forming fiber.

Production of the fast response time thermometer and Fabry-Perot refractive index sensors may utilize similar design structure-forming fibers. In the case of the optical evanescent field device, the inner cladding should be sufficiently thick, typically more than about 3 µm in radial thickness, in order to prevent evanescent filed interaction with surrounding material. For Fabry-Perot refractive index sensors, the inner cladding thickness may be below about 2 um, and in some embodiments, the Fabry-Perot refractive index sensor may have no cladding. The desired precise inner cladding diameter of the final field interaction region can be tuned either through adjustment of the inner cladding diameter within the structure-forming fiber or by the etching time (time of exposure to the etching medium).

Production process of an interferometric fast response time thermometer and a Fabry-Perot refractive index sensor of FIG. 23 typically requires formation of semi-reflective mirrors at the interfaces (ends) of the lead-in fibers or mirrors 2320, 2330 within the lead-in fibers 102, 104, as shown, to form a Fabry Perot cavity. Known methods can be used to achieve this. A deposition of thin film semi-reflective layer can be performed to either structure forming or ends of the lead-in fibers 102, 104 followed by splicing fibers together. Alternatively, short Fabry Perot cavities can be formed by pre-etching of lead-in fiber to create shallow cavity in the region of the lead-in fiber core. In the interferometric fast response time thermometer, an absorbent dopant material, such as described herein, is added to the field interaction region 2310. Splicing of such lead-in fiber with structure-forming fiber will form a short in-fiber cavity that can act as an in-fiber mirror as described for example in paper by Cibula et al., "Low-loss semi-reflective in-fiber mirrors," Opt. Express 18, 12017-12026 (2010). As shown in the FIG. 23 embodiment, it is advantageous to move fiber mirrors 2320, 2330 into lead-in fibers 102, 104, away from structure-forming fiber, where considerable material removal by etching is made. In such case the fiber mirrors 2320, 2330 are formed for example by previously described methods. For example, they may be formed by providing two lead-in fiber sections on each side of the mirror 2320, 2330. When mirrors 2320, 2330 are moved into the lead-in fibers 102, 104 they may also be formed as Bragg gratings or chirped Bragg gratings.

The production of embodiment of the fast response thermometer or refractive index sensor that are based on fiber Bragg gratings may utilize the same design of the structure forming fiber as in case of the optical evanescent field device. The Bragg grating can be inscribed in the core and/or central cladding region before or after production of the device utilizing known methods for such inscription. For example, the Bragg gratings may be inscribed by UV illumination through phase masks from the side of the field interaction region, by femtosecond laser inscription or similar methods.

Embodiments of fluid flow sensors may be produced in the same way as fast response time thermometers. The structure forming fiber for fluid flow sensor manufacturing can therefore utilize identical or similar design of the structure-forming fibers used in manufacturing of fast response time temperature sensors. The core of the structure-forming fiber may be doped with dopant that increases optical absorption. One such suitable dopant is vanadium. In some embodiments, dopant amounts of vanadium between about 0.01 mol % and 5 mol % in silica may be employed. When heating of the optical fiber sensor is performed indirectly, by heating of a location proximate to the lead-in fibers can be doped with dopant that causes high optical absorption as described above.

Figure 26A:
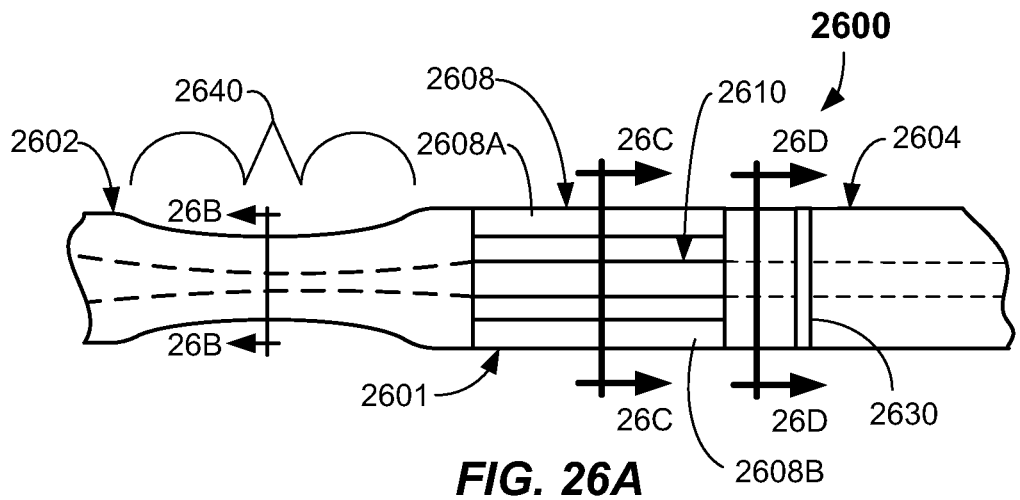
FIG. 26A illustrates a side view of an embodiment of an optical device including an in-line optical device that may be used as an interferometric fluid flow sensor according to an aspect of the invention.
Figure 26B:
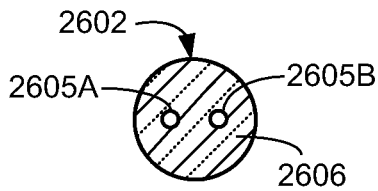
FIG. 26B illustrates a cross sectioned end view of a dual-core lead-in fiber taken along section line 26B-26B of FIG. 26A.
Figure 26C:
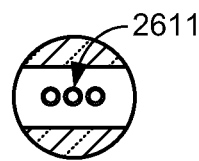
FIG. 26C illustrates a cross sectioned end view of an in-line optical device taken along section line 26C-26C of FIG. 26A.
Figure 26D:
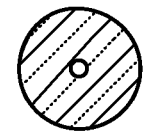
FIG. 26D illustrates a cross sectioned end view of a conventional lead-in fiber taken along section line 26D-26D of FIG. 26A.
Figure 26E:
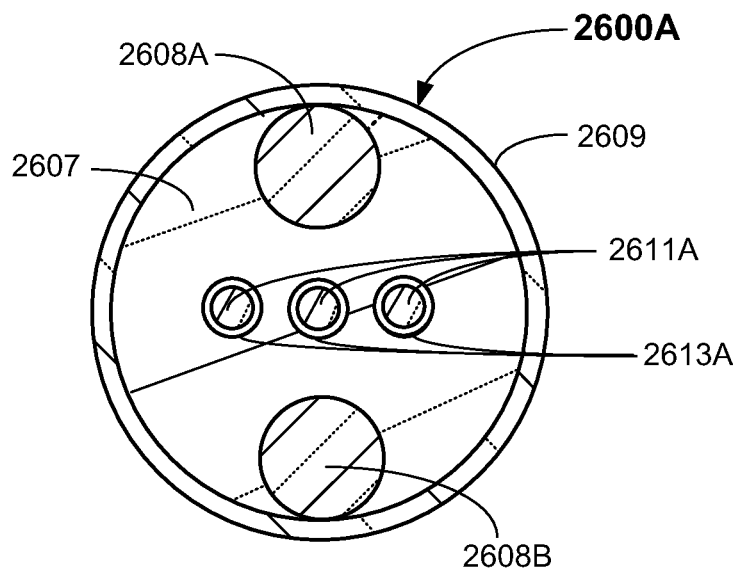
FIG. 26E illustrates an enlarged cross sectioned end view of a structure-forming fiber that may be used to manufacture the in-line optical device of FIG. 26A according to another aspect of the invention.

A manufacturing method for a more complex embodiment of a fluid flow sensor 2600 containing three rods is described with reference to FIGS. 26A-26E. The structure-forming fiber 2600A for forming the in-line optical device 2601 is shown in FIG. 26E. The structure-forming fiber 2600A contains support structure forming portions 2608A, 2608B, three cores 2611A surrounded by low etching rate cladding material 2613A (e.g., substantially-pure silica), and preferentially-etchable region 2607. Outer cladding 2609 may be optionally added for easier fiber manufacturing and bonding, such as fusion splicing. The outer cladding 2609 may be a substantially-pure silica layer, for example. One of the cores 2611, preferably the core in the center of the in-line optical device 2601, may be additionally doped with a dopant that causes high optical absorption. For example, vanadium may be provided in the amounts described above.

Furthermore, the fluid flow sensor 2600 may include at least one lead-in fiber 2602 containing two cores 2605A, 2605B surrounded by cladding 2606. The distance among these two cores should be the same as the distance between the respective outside cores of the in-line device 2601 to allow effective optical coupling among the core of the lead-in fiber 2602 and the in-line device 2601. The lead-in fiber 2602 may be further tapered or otherwise reformed by heating and pulling or other methods to bring both cores relative closer one to each other and thus permit optical coupling between them. The lead-in fiber 2604 may be a conventional optical fiber having a core and cladding and may include a mirror therein.

Figure 14:
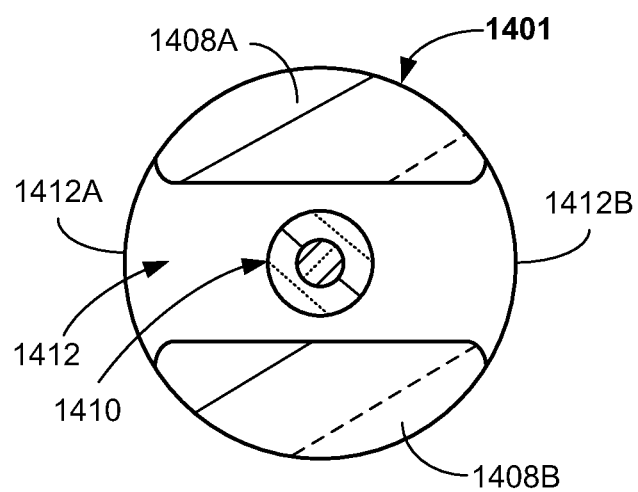
FIG. 14 illustrates a cross sectioned end view of an embodiment of an in-line optical device formed following etching of the structure-forming fiber of FIG. 13 according to an aspect of the invention.
Figure 15A:
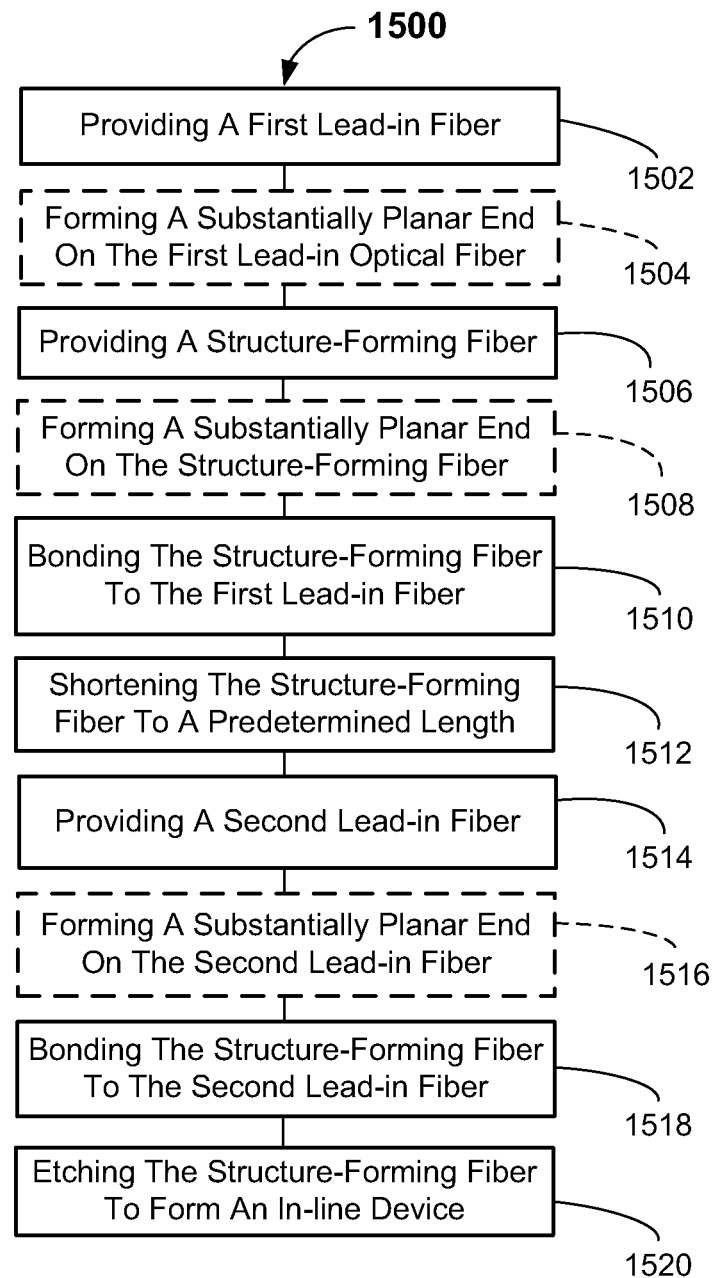
FIG. 15A illustrates a flowchart of a method according to another aspect of the invention.
Figure 15B:
FIGS. 15B-15F illustrates various steps (some being optional) in a method of manufacturing an in-line device according to another aspect of the invention.
Figure 15C:
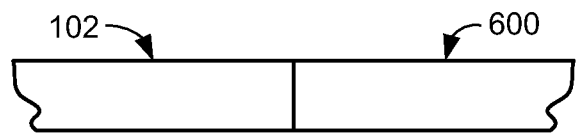
Figure 15D:
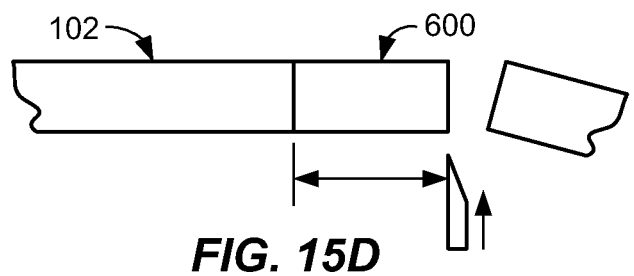
Figure 15E:
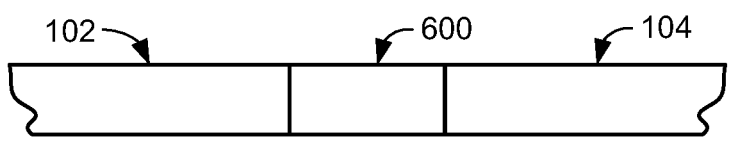
Figure 15F:
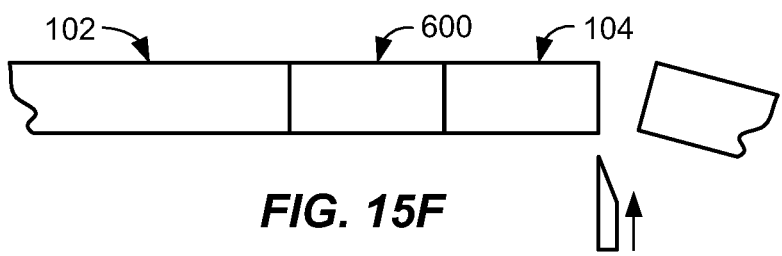
Figure 37:
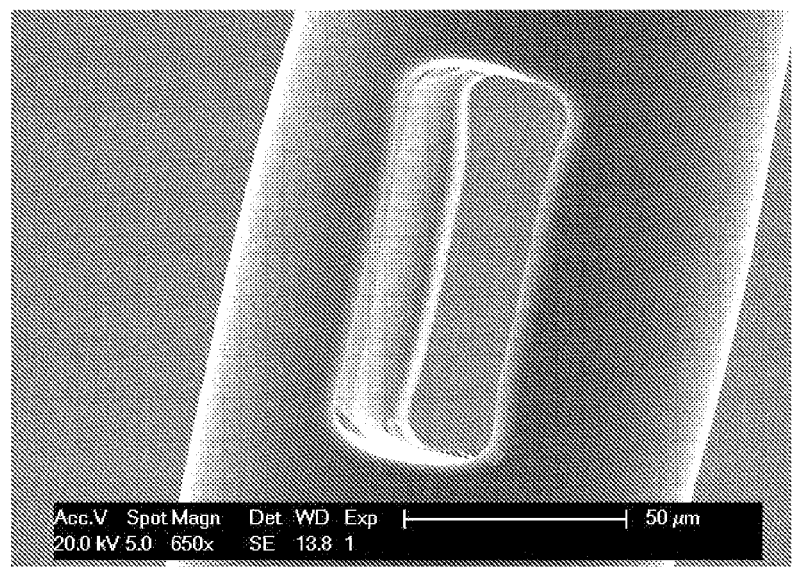
FIGS. 37-39 illustrate micrographs of exemplary embodiments of optical devices according to an aspect of the invention.

The structure-forming fiber for manufacturing of an optical device 2500, such as a microcell, may utilize the same structure-forming fiber 1300 as is used to produce the in-line optical devices of FIG. 14, except that the central core 1311 and inner cladding 1313 are omitted. Thus, upon exposure to the etching medium only a support structure having structure supports 2508A, 2508B is formed. The field interaction region 2510 in a direct path between the cores 105 of the lead-in fibers 102, 104 may be a non-solid void. However, optionally, the void may be filled any material that may concentrate chemical or biological species (e.g., a porous material). The axial length of the non-solid void between the ends of the lead-in fibers 102, 104 may be between 10 and 2,000 µm, for example. FIG. 37 illustrates a micrograph of an actual exemplary embodiment of optical device like device 2500 described in FIG. 25A according to an aspect of the invention.

Figure 25E:
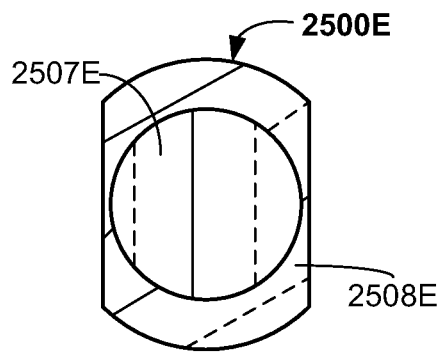
Figure 25F:
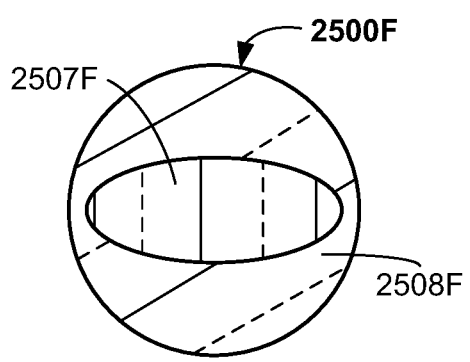
Figure 25G:
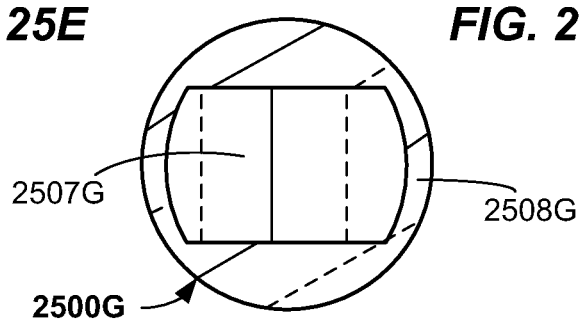

Several alternative structure-forming fibers 2500C-2500G are shown in FIGS. 25C-25G. The FIG. 25C embodiment is the same as the structure-forming fiber 600 of FIG. 6, except that the central core 611 and cladding 613 are omitted and replaced with preferentially-etchable portion 2507. The embodiment of FIG. 25D includes outer cladding 2509D as heretofore described (e.g., substantially pre silica) and a preferentially etchable portion 2507D (e.g., $P_2O_5$-doped silica) having structure forming portions 2508C, 2508D therein of a slow etching rate material (e.g., substantially-pure silica). FIGS. 25E-25G each include structure-forming portions 2508E-2508G of a slow etching rate material (e.g., substantially-pure silica), and preferentially-etchable portion 2507E-2507G of a fast etching rate material (e.g., $P_2O_5$-doped silica). Once the thin zones of the structure-forming portions 2508E-2508G are etched through by the etching medium, the preferentially-etchable portions 2507E-2507G are rapidly removed leaving only spaced and opposed support structures and a non-solid void extending between the lead-in fibers 102, 104. The embodiment of FIG. 25F may be manufactured by removing side portions of the preform used to manufacture the fiber and then drawing the fiber wherein viscous forces will cause the preferentially-etchable portion 2507F to elongate and take on an elliptical shape.

Furthermore, to prevent degradation of the respective end surfaces of the lead-in fibers 102, 104, which in some embodiments may be exposed to the etching medium during manufacturing, in another broad aspect of the invention, the cores 105 of the lead-in fibers 102, 104 may be doped with dopants that marginally affect the etching rates thereof. For example, the lead-in fibers 102, 104, or portions thereof, may be doped with dopants such as alumina and titania, for example. Alumina may be doped in an amount of between about 2.5 mol % and about 15 mol % in silica. Titania may be doped in an amount of between about 0.5 mol % and about 5 mol % in silica.

In other embodiments, as shown in FIG. 35, to substantially eliminate the affects of end surface degradation of lead-in fibers 102, 104 during the etching step, short segments of coreless fiber 3520, 3522 may be inserted between lead-in fibers 102 and the structure-forming fiber 3525. The segments of coreless fiber 3520, 3522 may be manufactured of substantially-pure silica, for example. The length of the segments of coreless fiber 3520, 3522 may be typically between about 1 µm and about 20 µm. Other lengths may be used. Addition of these segments of coreless fiber 3520, 3522 may allow relatively uniform and slow etching of optical surfaces of the microcell when they come in contact with etching medium during the production process.

As described above, the preferentially-etchable portions of the structure forming fibers, as well as other portions, for which a relatively higher rate of etching upon exposure to the etching medium is desired may include microcracks. Illumination of afore-mentioned areas of the structure-forming fiber with laser, particularly by using ultra short pulse, can cause formation of micro-cracks. When micro-cracks are present in the glass body they may increase the effective etching rate as described for example in "Shape control of microchannels fabricated in fused silica by femtosecond laser irradiation and chemical etching," Opt. Express, volume 17, 8685-8695 (2009) by Vishnubhatla et al., the disclosure of which is hereby incorporated by reference herein. The laser may be focused at any point within the structure-forming fiber to create conditions where micro-cracks can be formed. Micro-crack formation may be especially useful to increase an etching rate of a substantially-pure silica outer cladding at the outer surface. Laser micro-crack formation can be effectively used to break circular symmetry of the structure-forming fiber.

Figure 16:
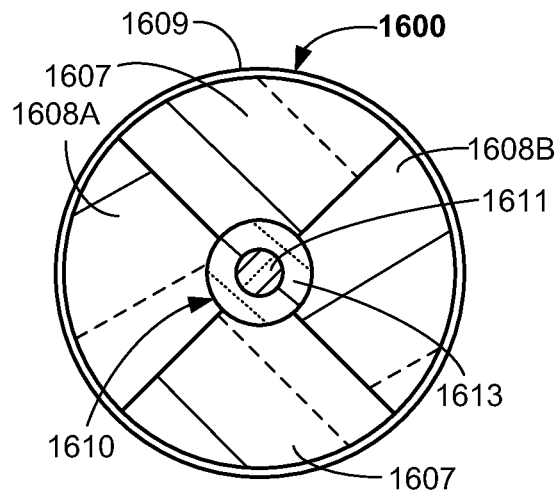
FIG. 16 illustrates a cross sectioned end view of another embodiment of a structure-forming fiber used to form an in-line optical device according to an aspect of the invention.
Figure 17:
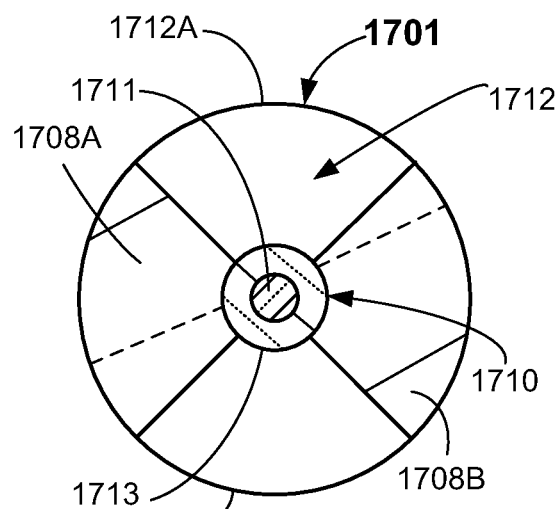
FIG. 17 illustrates a cross sectioned end view of an embodiment of an in-line optical device formed following etching of the structure-forming fiber of FIG. 16 according to an aspect of the invention.

In another embodiment, as shown in FIGS. 16 and 17, the in-line optical device 1701 includes a field interaction region 1710 having at least a core 1711 of an optically-transmissive material, and in the depicted embodiment also a cladding 1713. The field interaction region 1710 has a central axis extending along the length of the core 1711. A support structure is provided that is spaced from the central axis. The support structure includes support structure elements 1708A, 1708B spaced on opposite sides of the field interaction region 1710. The support structure has a first radial opening 1712A, and a second radial opening 1712B, each extending to the field interaction region 1710. FIG. 16 illustrates a suitable structure forming fiber 1600 that may be bonded between respective lead-in fibers (e.g., 102, 104) to form an optical device. The fiber 1600 includes a field interaction region forming portion 1610 including a core 1611 and cladding 1613. The core 1611 and cladding 1613 may be of materials as herein described. Preferentially etchable portions 1607 and structure forming portions 1608A, 1608B may be formed as arc segments. The segments 1607, 1608A, 1608B may be any suitable size and of materials described in previous embodiments. An annular outer cladding 1609 of substantially-pure silica may be provided, for example. Upon removal via etching of the thin cladding 1609, the preferentially-etchable portions 1607 thereafter etch at a higher rate than the structure-forming portions 1608A, 1608B and inner cladding 1613 thereby forming openings 1712A and 1712B which extend to the cladding 1713 and support structures 1708A, 1708B. For example, as shown, the segments 1607, 1608A, 1608B may each encompass a pie-shaped arc of about 90 degrees. However, the segments 1607, 1608A, 1608B may be of any suitable size and shape to allow access to the interaction region 1710 from the multiple openings 1712A, 1712B and provide extra support for the field interaction region 1710 along its length. The access to the evanescent field from both sides can be used to enhance the sensitivity of the optical device and thus shorten the required interaction length. Additionally, access from both sides may provide high mechanical strength of the structure as the structure relies on relatively large amount of material in final device cross section. Double side access may also allow for introduction of two distinctive functional layers on opposite sides of the structure, for example, to provide sensing of two different parameters.

The foregoing description discloses only exemplary embodiments of the invention. Modifications of the above-disclosed apparatus, systems, and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

The invention claimed is:

1. An in-line optical device, comprising:
a field interaction region of an optically-transmissive material, the field interaction region having a central axis;
a support structure spaced from the central axis having one or more radial openings, the support structure including at least a portion of silica material; and
a void between the support structure and the field interaction region, the void substantially surrounding the field interaction region and bounded by an end surface of at least one optical fiber, wherein the void is adapted to receive a functionalized material including a fluid to interact with the field interaction region.

2. The in-line optical device of claim 1, wherein the support structure comprises a substantially cylindrical outer surface portion.

3. The in-line optical device of claim 1, wherein the support structure comprises two support structures spaced on opposite sides of the field interaction region.

4. The in-line optical device of claim 3, wherein the two support structures each comprise a cylindrical outer surface and a generally planar inner surface.

5. The in-line optical device of claim 3, wherein the support structure comprises a cylindrical outer surface and a cylindrical inner surface.

6. The in-line optical device of claim 3, wherein the support structures comprises at least one rod.

7. The in-line optical device of claim 1, wherein the field interaction region comprises a substantially cylindrical outer surface.

8. The in-line optical device of claim 7, wherein the field interaction region comprises a core and a cladding.

9. The in-line optical device of claim 1, wherein the field interaction region comprises a core that abuts the void.

10. The in-line optical device of claim 1, wherein the field interaction region comprises two cores.

11. The in-line optical device of claim 1, wherein the void comprises a first radial opening on a first side of the field interaction region and a second radial opening on an opposite side of the field interaction region and wherein the openings extend to the field interaction region.

12. The in-line optical device of claim 1, wherein the field interaction region comprises a core having a core length that is shorter than an axial length of the void.

13. The in-line optical device of claim 1, wherein the field interaction region includes at least one functionalized material layer that includes a fluid transmission layer having one of macro-capillaries, micro-capillaries or nano-capillaries.

14. The in-line optical device of claim 1, wherein the field interaction region includes at least one functionalized material layer from the group consisting of a nano-material, a reaction material, a non-linear material, a thermo-chromatic material or an absorbing material.

15. The in-line optical assembly of claim 1, wherein the field interaction region includes at least one functionalized material layer, and the functionalized material layer is from the group consisting of an organic optical coating having immobilized enzymes, an organic optical coating with immobilized dies or a nano-structured coating.

16. An in-line optical device, comprising:
- a field interaction region comprising a non-solid void, the non-solid void is bounded by an end surface of at least one optical fiber and adapted to receive a functionalized component to interact with the field interaction region, the field interaction region having a central axis; and
- a support structure spaced from the central axis having one or more radial openings, the support structure including at least a portion of silica material.

17. An optical device, comprising:
- a first lead-in optical fiber;
- a second lead-in optical fiber; and
- an in-line optical device coupled between the first lead-in optical fiber and the second lead-in optical fiber, the in-line optical device including:
  - a field interaction region of an optically-transmissive material, the field interaction region having a central axis,
  - a support structure spaced from a central axis having one or more radial openings, the support structure including at least a portion of silica material, and
  - a void between the support structure and the field interaction region, the void substantially surrounding the field interaction region and bounded by an end surface of the first lead-in optical fiber and the second lead-in optical fiber,
  - wherein the void is adapted to receive an interaction device to engage with the field interaction region.

* * * * *